US007430909B2

(12) United States Patent  (10) Patent No.: US 7,430,909 B2
Adams et al.  (45) Date of Patent: Oct. 7, 2008

(54) TRI-AXIS ACCELEROMETER

(75) Inventors: Scott G. Adams, Ithaca, NY (US); Scott A. Miller, Groton, NY (US); June Shen-Epstein, Freeville, NY (US); Keith Epstein, Freeville, NY (US)

(73) Assignee: Kionix, Inc., Ithaca, NY (US)

( * ) Notice: Subject to any disclaimer, the term of this patent is extended or adjusted under 35 U.S.C. 154(b) by 8 days.

(21) Appl. No.: 11/600,175

(22) Filed: Nov. 16, 2006

(65) Prior Publication Data

US 2007/0119252 A1  May 31, 2007

Related U.S. Application Data

(60) Provisional application No. 60/738,580, filed on Nov. 22, 2005.

(51) Int. Cl.
 *G01P 15/125* (2006.01)
(52) U.S. Cl. ..................... 73/510; 73/514.38
(58) Field of Classification Search .......... 73/510, 73/511, 514.32, 514.29, 514.36, 514.38
See application file for complete search history.

(56) References Cited

U.S. PATENT DOCUMENTS 5,563,343 A    10/1996   Shaw et al.
5,610,335 A    3/1997    Shaw et al.
6,009,757 A    1/2000    LeComte et al.
6,051,866 A    4/2000    Shaw et al.
6,239,473 B1   5/2001    Adams et al.
6,318,174 B1   11/2001   Schmiesing et al.
6,342,430 B1   1/2002    Adams et al.
6,701,786 B2   3/2004    Hulsing, II
6,792,804 B2   9/2004    Adams et al.
2001/0047688 A1  12/2001  Woodruff et al.
2005/0132804 A1  6/2005   Park et al.
2005/0217374 A1  10/2005  Chen et al.

OTHER PUBLICATIONS

International Search Report and Written Opinion for PCT/US06/44517, 7 pages, dated Jul. 30, 2007.

*Primary Examiner*—Helen C. Kwok
(74) *Attorney, Agent, or Firm*—Sterne, Kessler, Goldstein & Fox P.L.L.C.

(57) ABSTRACT

In an embodiment of the present invention there is provided a micro-electromechanical (MEMS) accelerometer, including a substrate, a first sensor and a second sensor. The first sensor is configured to measure an acceleration along a first axis parallel to a plane of the substrate. The second sensor is configured to measure an acceleration along an axis perpendicular to the plane of the substrate. The second sensor comprises a first beam, a second beam and a single support structure. The single support structure supports the first and second beams relative to the substrate, wherein the first and second beams circumscribe the first sensor.

41 Claims, 24 Drawing Sheets

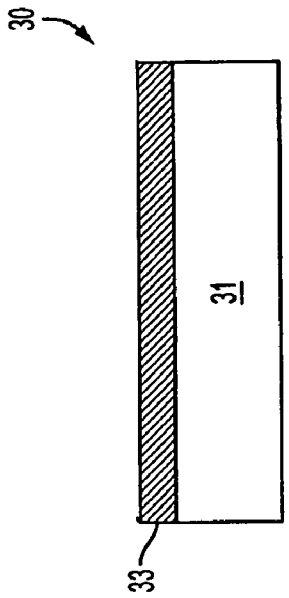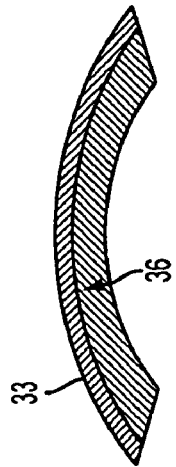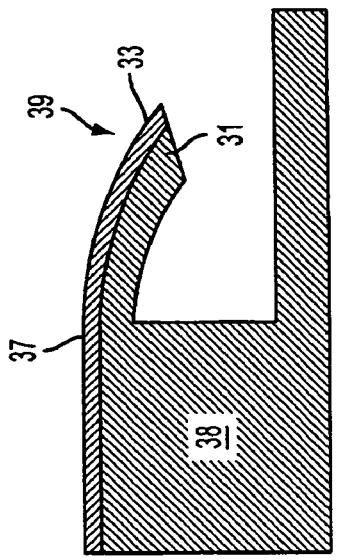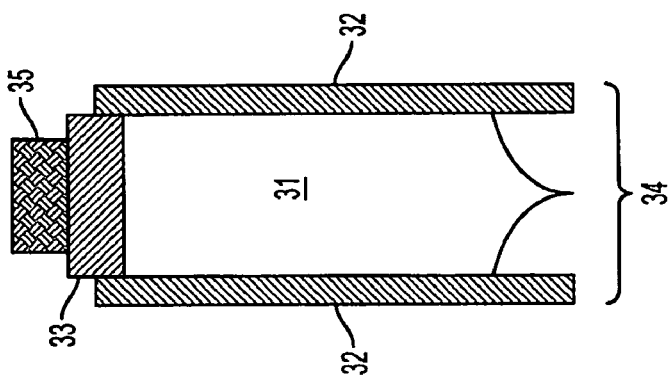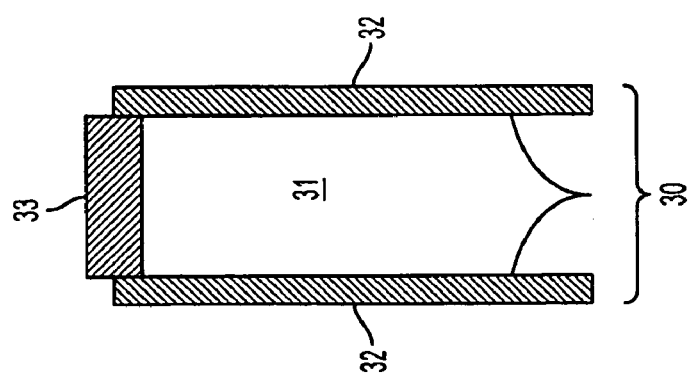

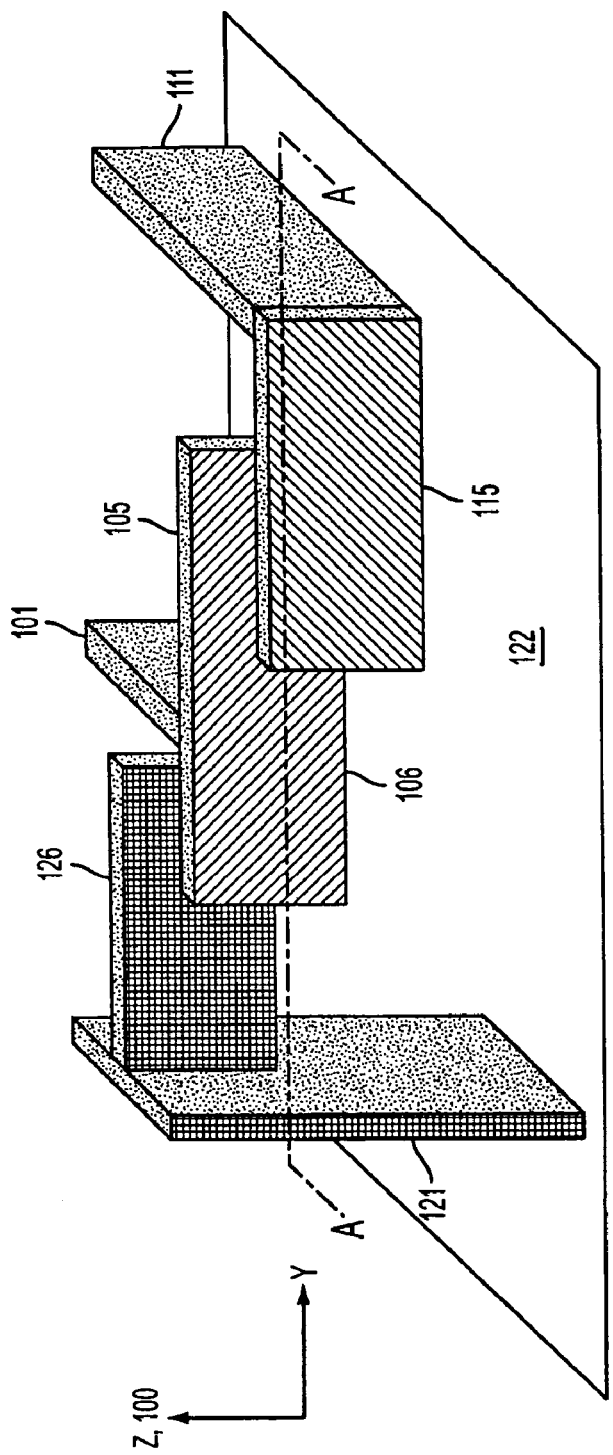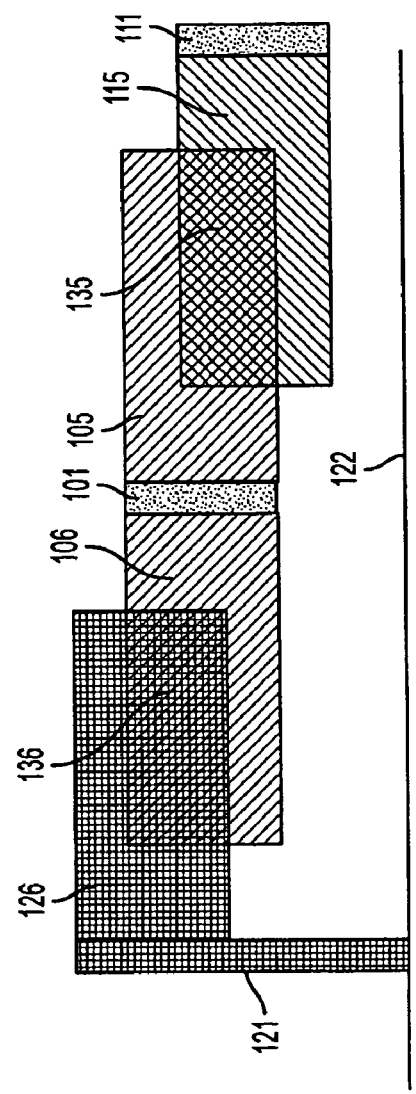
FIG. 7A
FIG. 7B

TRI-AXIS ACCELEROMETER

CROSS REFERENCE TO RELATED APPLICATIONS

This application claims benefit under 35 U.S.C. § 119(e) to U.S. Provisional Patent Application 60/738,580, entitled "A Tri-Axis Accelerometer," to Adams et al., filed on Nov. 22, 2005, the entirety of which is hereby incorporated by reference as if fully set forth herein.

BACKGROUND OF THE INVENTION

1. Field of the Invention

The present invention is directed generally to micro-electromechanical systems (MEMS) accelerometers.

2. Background Art

An accelerometer is a device that measures an acceleration. Using MEMS technology, an accelerometer can be fabricated on a (silicon) substrate. Accelerometer elements constructed using MEMS include structures similar to a standard accelerometer: a proof-mass, restoring springs, a displacement transducer, some form of damping, and a case to which everything is attached.

For example, FIG. 1A illustrates an example accelerometer with a few features specific to a subset of MEMS accelerometers. Shown is a proof mass 1, pair of restoring springs 2, a case 3, displacement transducers 4 and 5, and a damper 6. Case 3, although drawn as two separate pieces and shown in cross-section, is assumed to be constructed as one effectively rigid body. Displacement transducers 4 and 5 are shown as differential capacitance transducers, but could be piezoelectric transducers or some other form of transducer, as would be apparent to a person skilled in the relevant art(s).

In response to a horizontal acceleration to the left, proof mass 1 will move to the right. As a result of this motion, the capacitance of displacement transducer 5 increases while the capacitance of displacement transducer 4 decreases. The difference in capacitance between displacement transducers 4 and 5 provides a measure of the relative motion of proof mass 1 with respect to case 3, and hence a measure of the acceleration to which proof mass 1 is being subjected. Any ringing of the accelerometer due to sudden acceleration changes is damped by damper 6.

To provide the necessary electrical circuitry, such a MEMS accelerometer can be wire bonded to an Application Specific Integrated Circuit (ASIC). An electrical model for the accelerometer of FIG. 1A is shown in FIG. 1B. The differential capacitance between capacitors 4 and 5 can be measured in many ways. Typically square wave carrier signals that are 180 degrees out of phase are sent into terminals 7 and 8. These carrier signals are referred to simply as carrier 1 and carrier 2, respectively, in this discussion.

The magnitude of the square waves depends on the ASIC technology used; however, voltages in the 1.8 to 5V range are typical. As the square wave voltages transition from high to low or low to high, a charge must flow through terminal 9. If the two sides are balanced, no net charge flows. By measuring the amount of charge that flows through terminal 9, one has a measure of the capacitance difference and hence the acceleration to which the device is being subjected. Terminal 9, the terminal on the ASIC that integrates the charge, is referred to as the charge-in pad. Multiple sensors on the same MEMS die can share the carrier signals. For example an X sensor and a Y sensor can both use carriers 1 and 2 in the capacitance measurements; however, a separate charge-in connection is necessary for each sensor direction.

The MEMS accelerometer and ASIC are packaged in a packaging unit. Consequently, a full accelerometer based on MEMS is typically constructed of three components: (1) a MEMS element that senses acceleration, (2) electronics included in an ASIC that transduces the MEMS element's response to acceleration into an electronic signal, and (3) a package that houses the first and second components. A problem with current MEMS accelerometers is that they are temperature and package sensitive. That is, the detection of an acceleration by a MEMS accelerometer may be affected by changes in temperature and/or by stresses imposed on the packaging unit.

Therefore, what is needed is an improved MEMS accelerometer that is less temperature and package sensitive. In addition, the improved MEMS accelerometer should be configured to occupy as little of an area of the substrate as possible to thereby minimize the overall size of the accelerometer.

BRIEF SUMMARY OF THE INVENTION

An embodiment of the present invention provides an improved MEMS accelerometer that is less temperature and package sensitive. In addition, this improved MEMS accelerometer is configured to occupy as little of an area of the substrate as possible.

In an embodiment of the present invention there is provided a MEMS accelerometer, including a substrate, a first sensor and a second sensor. The first sensor is configured to measure an acceleration along a first axis parallel to a plane of the substrate. The second sensor is configured to measure an acceleration along an axis perpendicular to the plane of the substrate. The second sensor comprises a first beam, a second beam and a single support structure. The single support structure supports the first and second beams relative to the substrate, wherein the first and second beams circumscribe the first sensor.

In another embodiment of the present invention there is provided a method for configuring a micro-electromechanical accelerometer. The method includes the following steps. A first sensor is supported relative to a substrate by a single support structure, wherein the first sensor is configured to measure an acceleration along an axis perpendicular to a plane of the substrate. The first sensor includes a first beam and a second beam. A second sensor is circumscribed by the first and second beams of the first sensor, wherein the second sensor is configured to measure an acceleration along a first axis parallel to the plane of the substrate.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 3A, 3B, 3C, 3D, and 3E illustrate beams fabricated with plasma micromachining.

Figure 4:
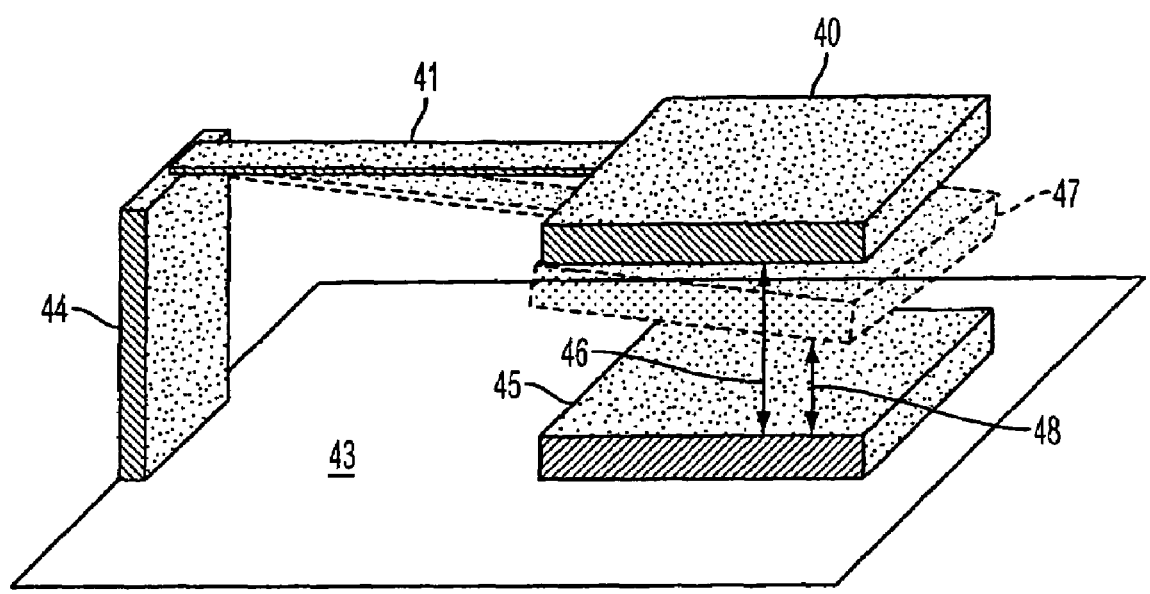

FIG. 4 illustrates basic conceptual components included in an out-of-plane accelerometer.

Figure 5A:
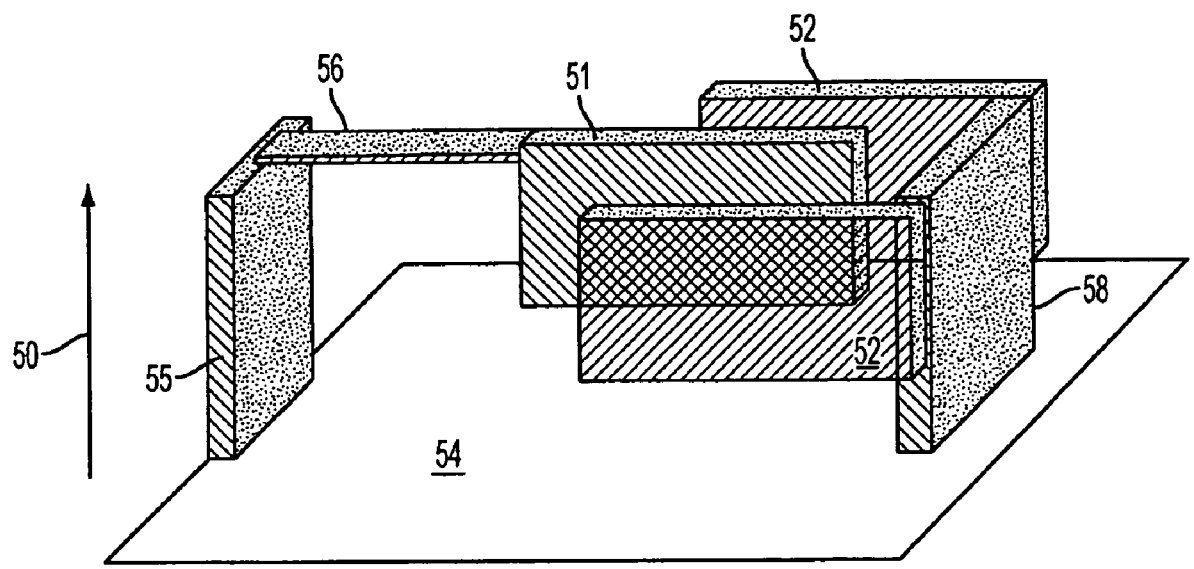
Figure 5B:
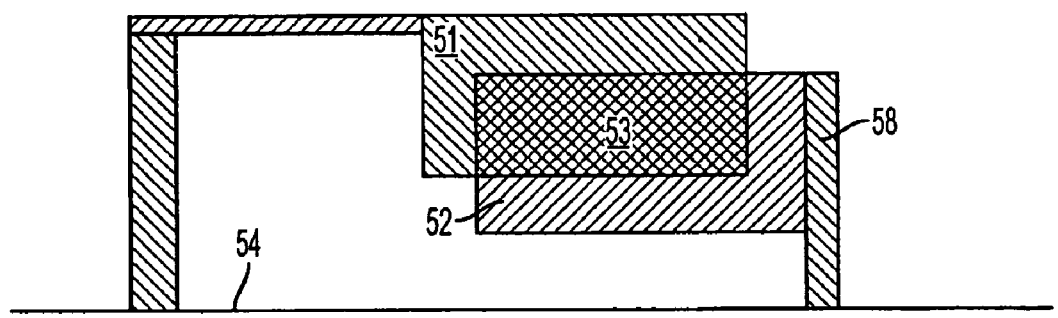

FIGS. 5A and 5B illustrate an example configuration of an out-of-plane accelerometer.

Figure 6:
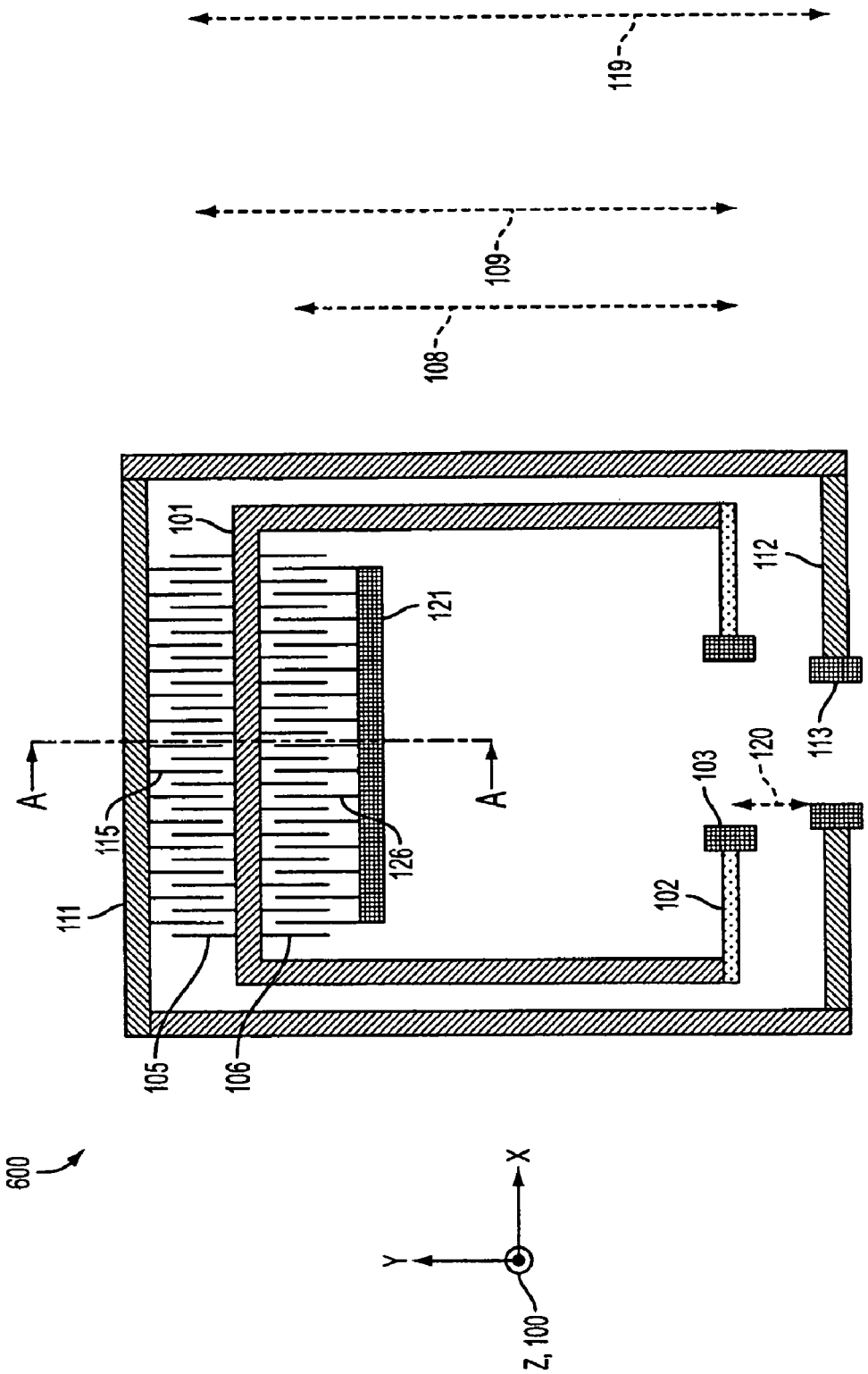

FIG. 6 illustrates a top view of an example configuration of an out-of-plane accelerometer that is sensitive to packaging stresses and temperature variations.

FIGS. 7A and 7B illustrate a perspective and cross-sectional view, respectively, of the example out-of-plane accelerometer shown in FIG. 6.

Figure 8:
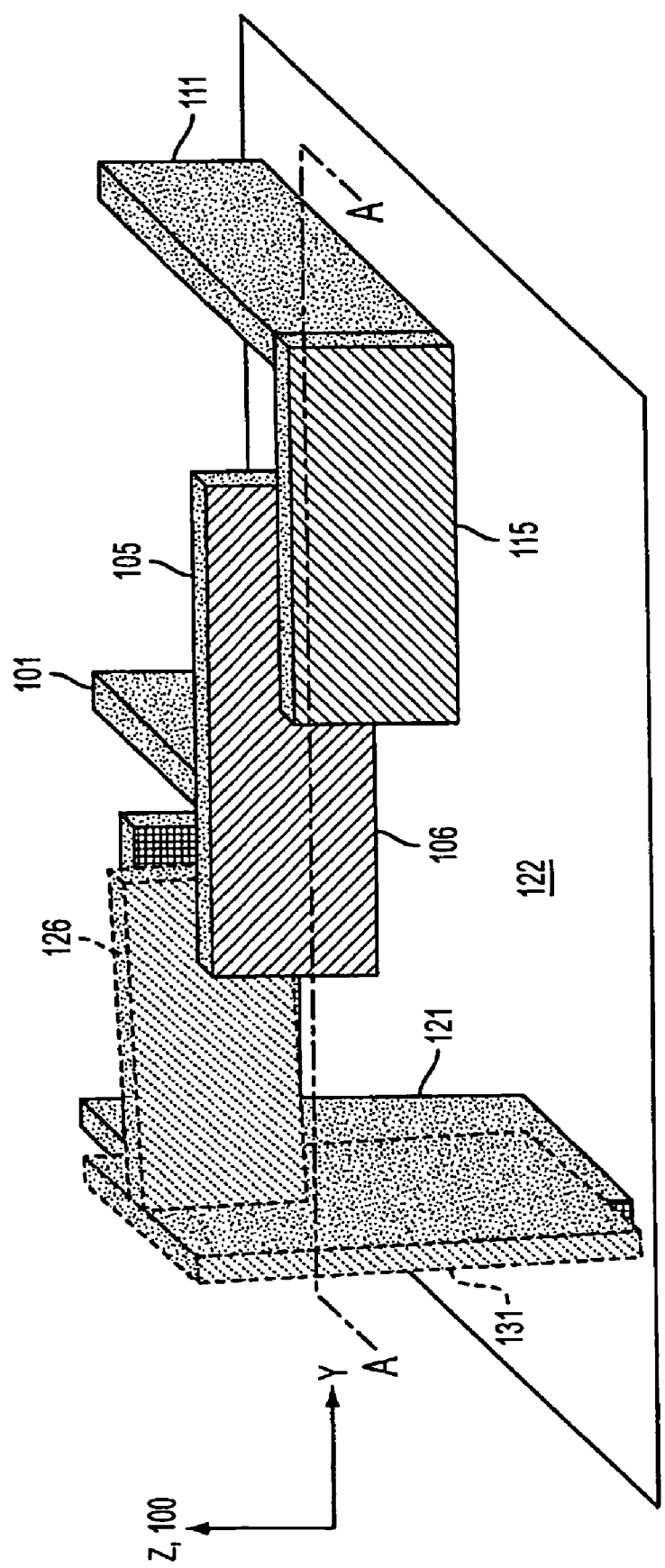

FIG. 8 illustrates how packaging stresses can affect the configuration of the example accelerometer shown in FIGS. 6, 7A and 7B.

Figure 9:
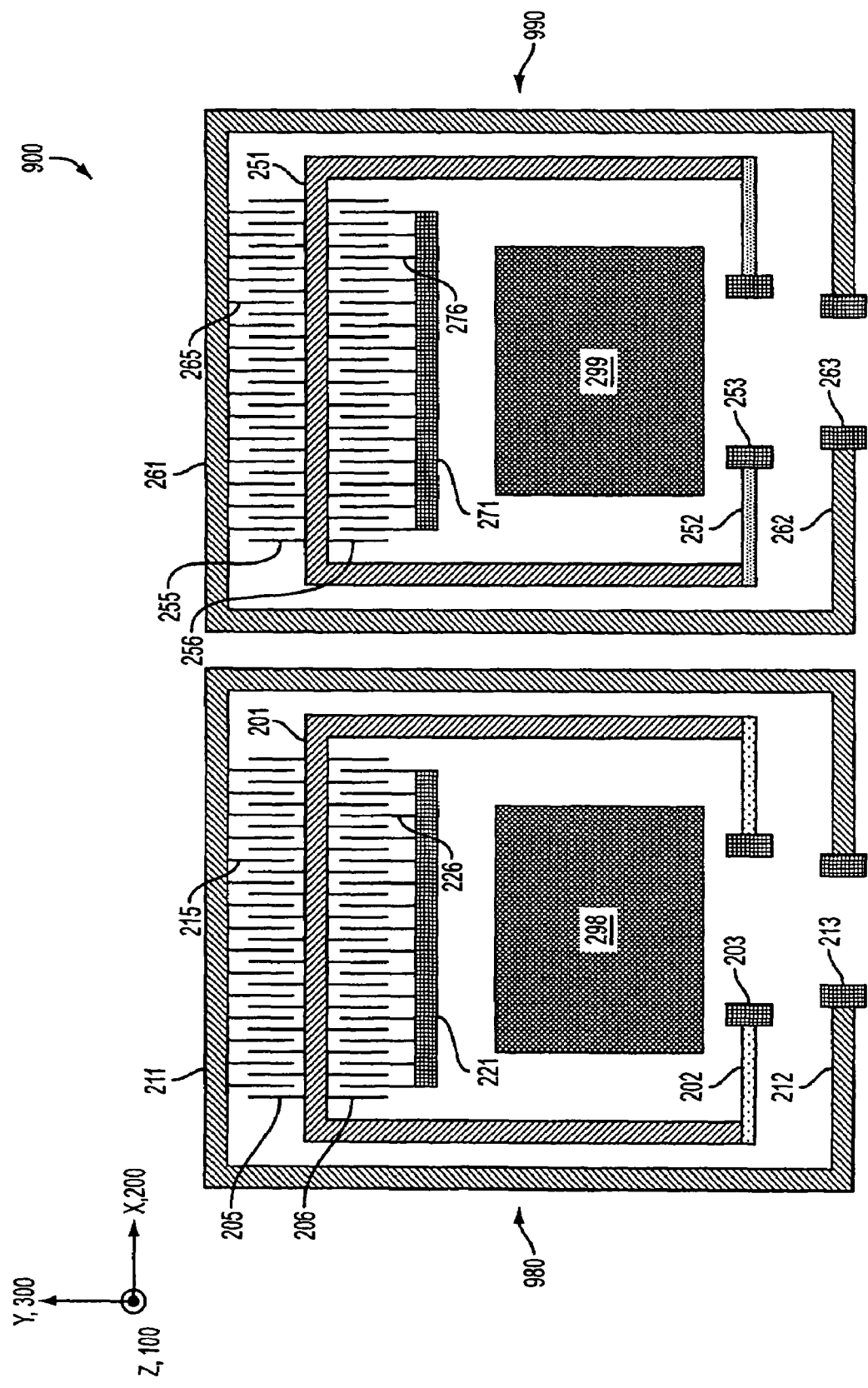

FIG. 9 illustrates a top view of an example configuration of an out-of-plane accelerometer designed to reduce sensitivity to packaging stresses.

Figure 10A:
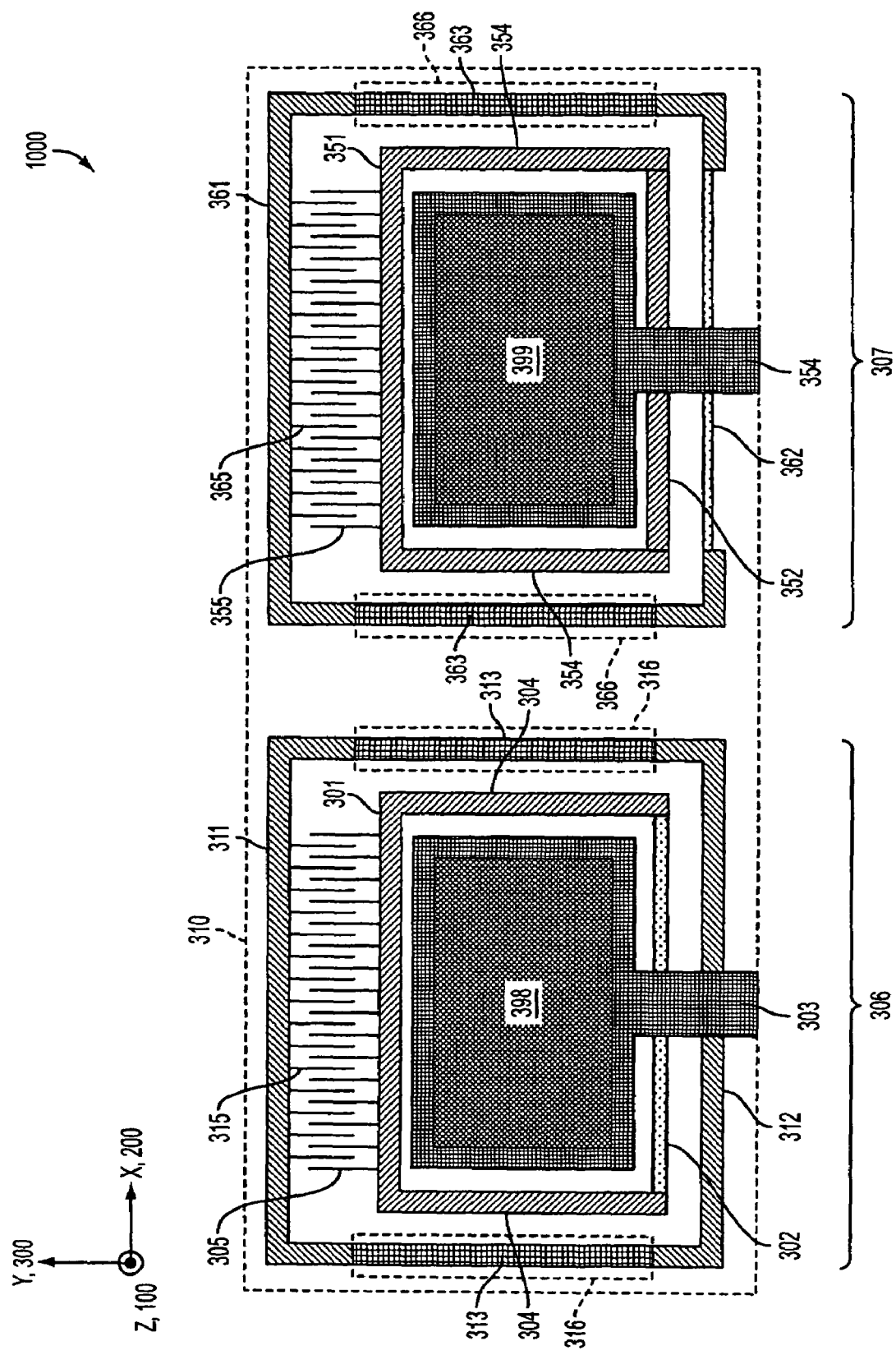

FIG. 10A schematically illustrates elements included in a tri-axis accelerometer in accordance with an embodiment of the present invention.

FIGS. 10B, 10C, 10D, 10E, 10F, 10G and 10H collectively illustrate a process for creating different field oxide thicknesses in certain regions of the accelerometer of the present invention.

Figure 11:
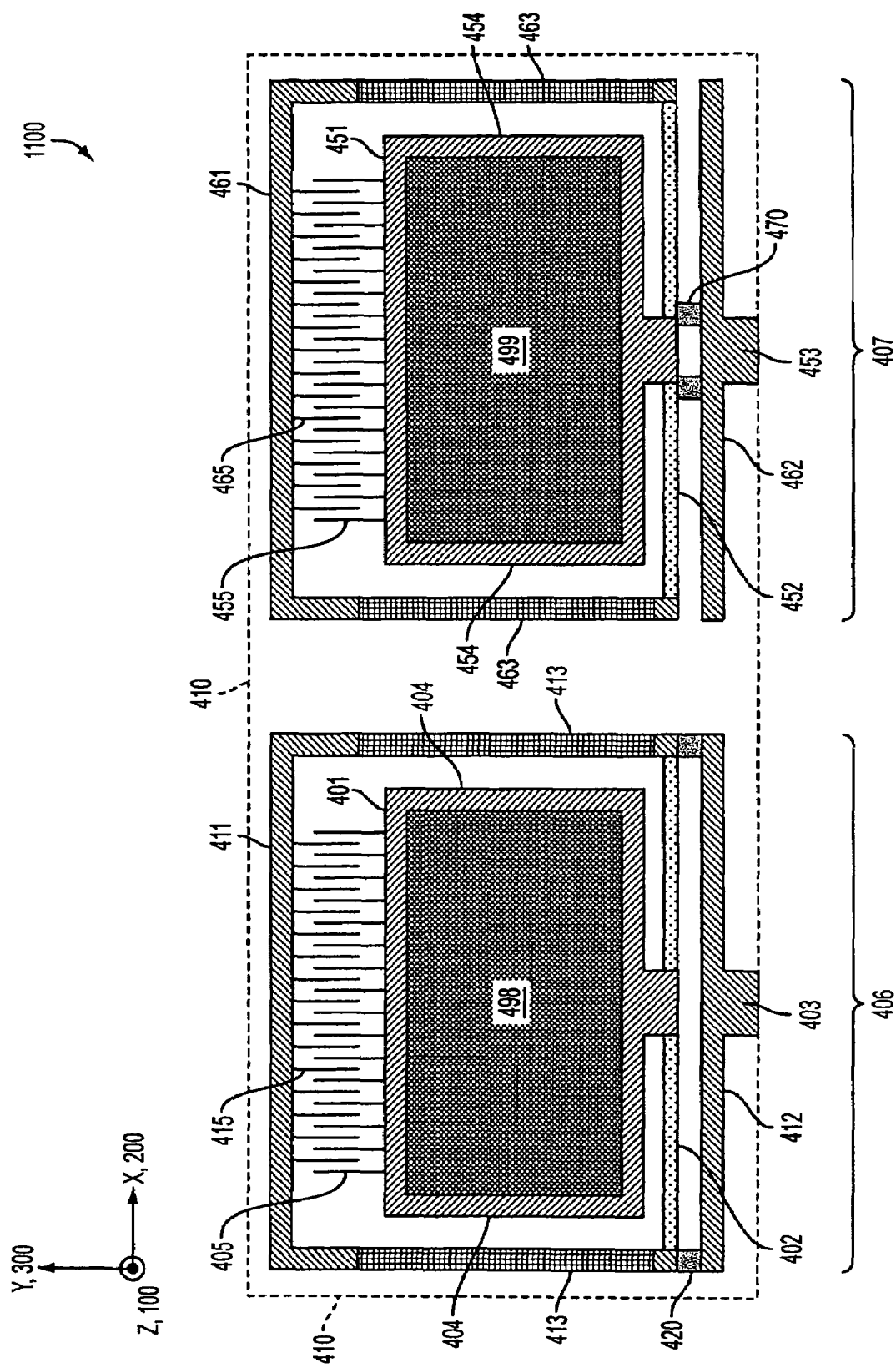

FIG. 11 schematically illustrates a tri-axis accelerometer in accordance with another embodiment of the present invention.

FIGS. 12, 13, 14 and 15 depict a design layout of the tri-axis accelerometer schematically illustrated in FIG. 11.

FIGS. 16, 17, 18 and 19 depict a design layout of the tri-axis accelerometer schematically illustrated in FIG. 10.

Figure 20:
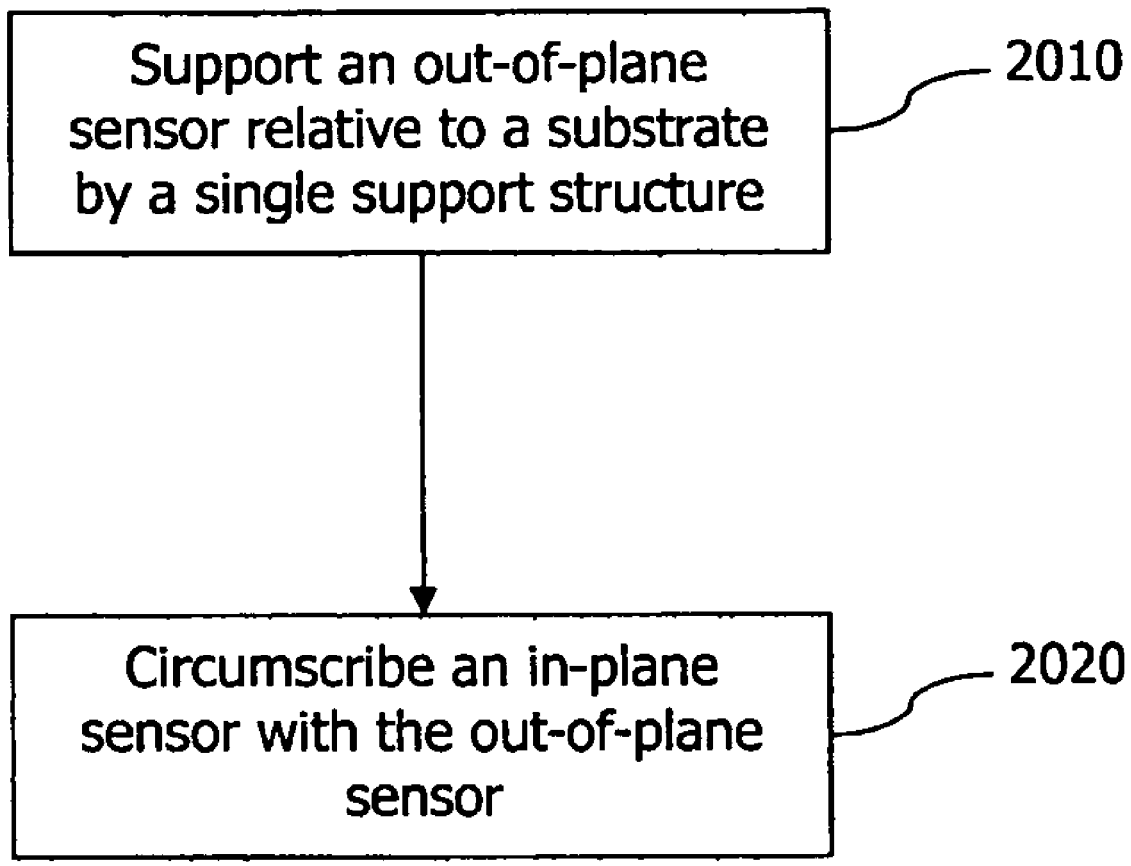

FIG. 20 depicts a flowchart illustrating a method for configuring an accelerometer in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In what follows, sensing devices are described as using a capacitive coupling between electrode elements to sense acceleration. This is for illustrative purposes only, and not limitation. An electrical coupling other than a capacitive coupling can be used to sense an acceleration without deviating from the scope and spirit of the present invention. For example, an electrical coupling can include, but is not limited to, a capacitive coupling, a piezoelectric coupling, a magnetic coupling, or some other electrical coupling as would be apparent to a person skilled in the relevant art(s) from reading the description contained herein.

As mentioned above, the present invention is directed to a MEMS sensor element design. A MEMS sensor element is typically fabricated out of a (silicon) substrate. During the discussion, the terms case and substrate will be used interchangeably. First, before describing embodiments of the present invention, an overview of in-plane (e.g., X axis) accelerometers is provided. Second, an overview of out-of-plane (e.g., Z axis) accelerometers is provided. Third, tri-axis accelerometers in accordance with embodiments of the present invention are described. Fourth, a method for configuring a MEMS accelerometer in accordance with an embodiment of the present invention is described.

Overview of In-Plane Accelerometers

Figure 2A:
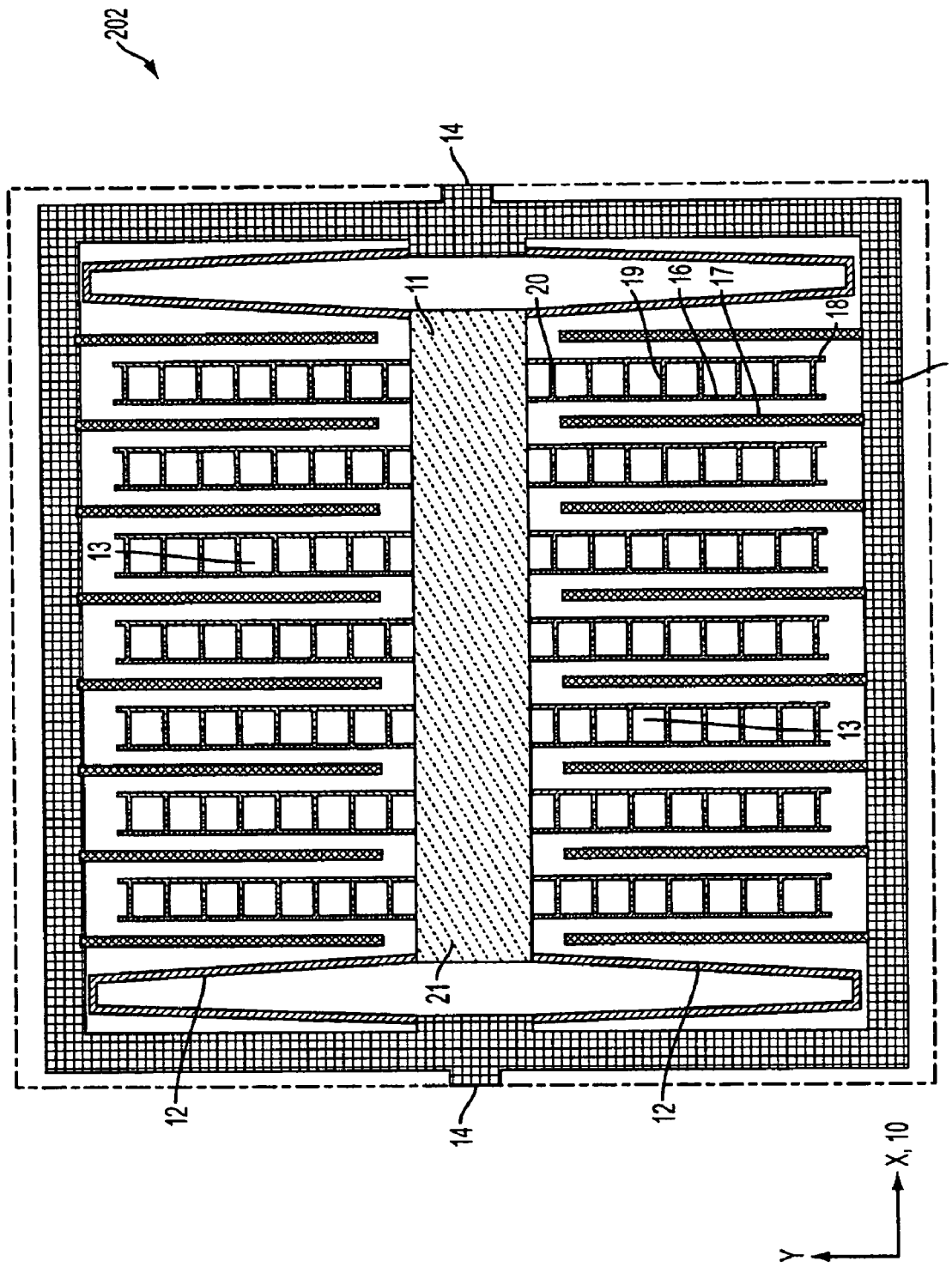
FIG. 2A illustrates a top view of a configuration of an example in-plane accelerometer.
Figure 2B:
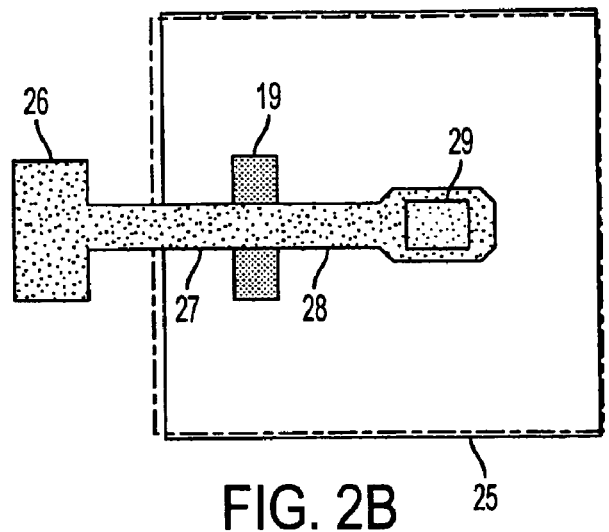
FIGS. 2B and 2C illustrate a top view and a perspective view, respectively, of an element included in an in-plane accelerometer.
Figure 2C:
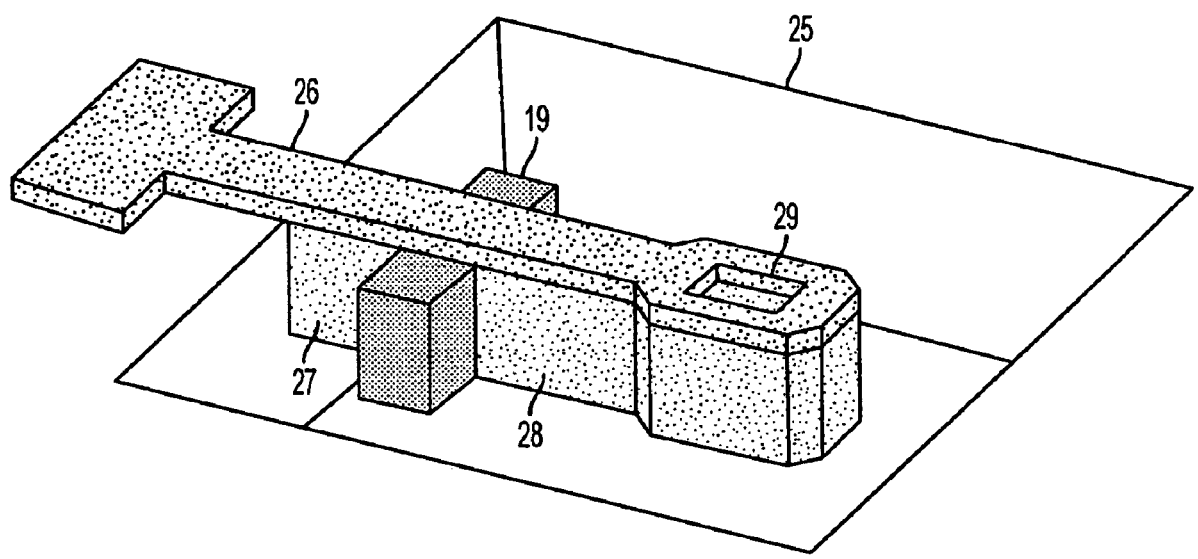

The layout for an example MEMS element fabricated by Kionix, Inc., of Ithaca, N.Y., is shown in FIGS. 2A, 2B, and 2C. Fabrication details for the device are described in U.S. Pat. Nos. 6,342,430 and 6,239,473. Basic operating principles and accelerometer designs are described in U.S. Pat. Nos. 5,610,335 and 5,563,343. A variation on the operating principles used to construct Z accelerometers, i.e. out-of-plane sensing accelerometers, is described in U.S. Pat. No. 6,792,804. The entirety of each of the foregoing patents is incorporated by reference herein.

The device shown in FIGS. 2A, 2B, and 2C is an in-plane accelerometer element 202 capable of sensing acceleration along an X axis 10. The device includes a central backbone 11 that connects restoring springs 12 to a frame 15. Although drawn as a solid rectangle, backbone 11 could be fabricated from a truss of beams. A plurality of parallel plate capacitors 13 for sensing motion in the direction of X axis 10 are provided on either side of the central backbone 11. Parallel plate capacitors 13 are interdigitated with electrodes 17 extending from frame 15. Also shown in FIG. 2A is the location of isolation joints 19, which are structurally depicted and described below with reference to FIG. 2C.

The portion of the capacitors 13 that moves is generally indicated by electrodes 20 that extend from backbone 11. An acceleration to the right along the direction of the X-axis 10 will cause a movable structure 21 to move left with respect to frame 15. Movable structure 21 includes backbone 11 and electrodes 20. Restoring springs 12 are connected to frame 15, and frame 15 is connected to case 14. Frame 15 is stiff and rigid in that it does not move relative to case 14.

An electrical connection from standard integrated circuit bonding pads to the micromechanical accelerometer is made using aluminum interconnect traces 26, as shown in FIG. 2B, that are common in the electronics industry. These traces can be run along beams 27 and 28 without electrically connecting to beams 27 and 28 until reaching a via 29. Electrical isolation between case 14 and the connection at via 29 is achieved using a trench isolation segment 19. Trench isolation methods are described below and in the previously mentioned U.S. Pat. Nos. 6,342,430 and 6,239,473. As shown in FIG. 2C the beams 27 and 28 are effectively carved out of the (silicon)

substrate. The region where the silicon etching takes place is the trench area 25 minus any area for structures such as that defined by beams 27 and 28.

Figure 1A:
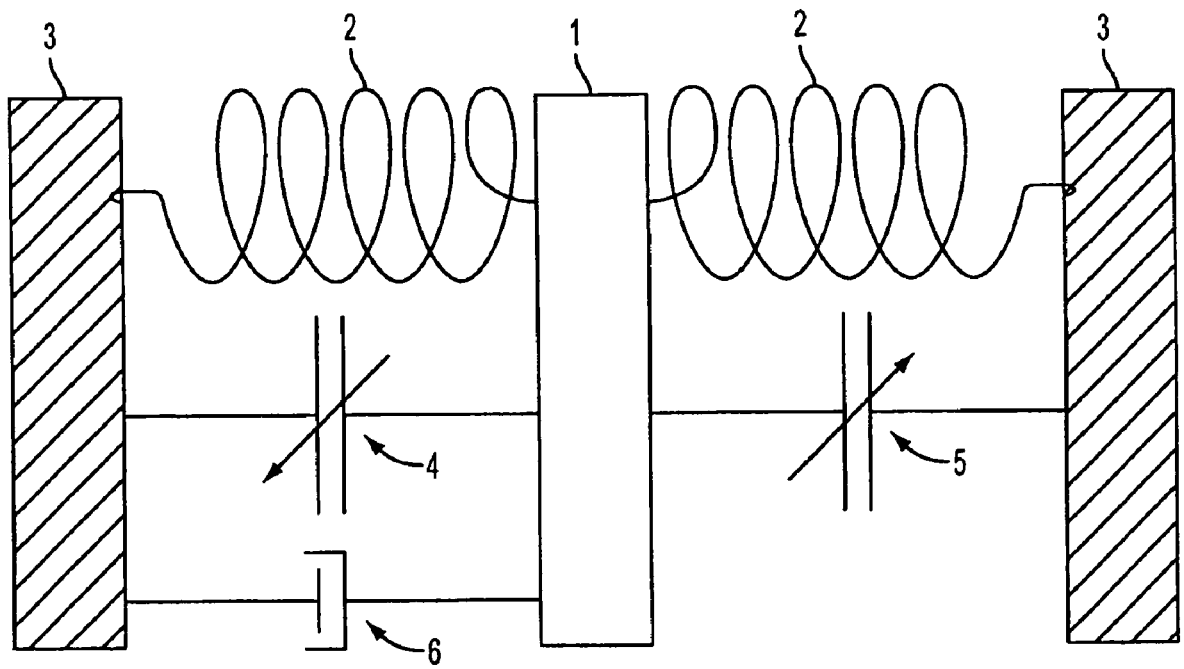
FIG. 1A illustrates major components included in a typical MEMS accelerometer.
Figure 1B:
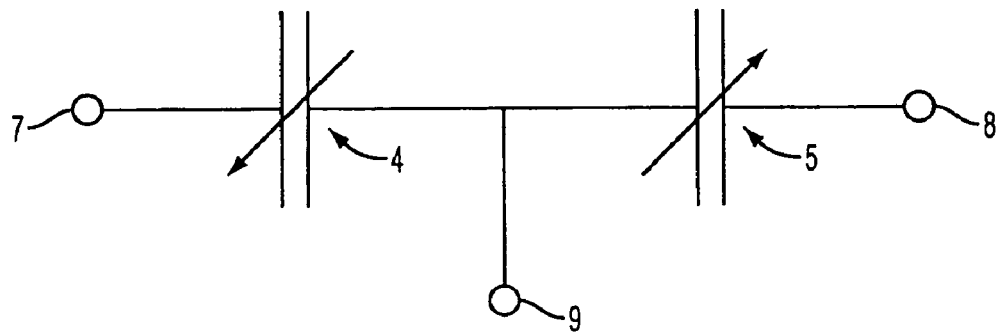
FIG. 1B illustrates an electrical model of the MEMS accelerometer depicted in FIG. 1A.

The function of the accelerometer is such that an acceleration to the right along the direction of the X-axis 10 will cause movable structure 21 to move left with respect to frame 15. Electrodes 20 therefore also move to the left. Electrodes 20 are comprised of two types of electrodes 16 and 18 separated by isolation joints 19. Electrodes 16 and 18 correspond to terminals 7 and 8 in FIG. 1B. Electrode 17 corresponds to terminal 9 in FIG. 1B.

The accelerometer structure shown in FIGS. 2A-2C is constructed using high aspect ratio silicon beams. For example, FIGS. 3A, 3B, 3C, 3D and 3E illustrate several cross sectional views of a beam 30. As shown in FIG. 3A a core 31 of beam 30 is single crystal silicon, but could equally well be fabricated using other materials such as a thick layer of polysilicon, as would be apparent to a person skilled in the relevant art(s). Cladding the sides of core 31 is a deposited TEOS oxide 32 which is an artifact of the fabrication process used to create the beams, such as beam 30. On top of core 31 is a field oxide 33. FIG. 3B illustrates an alternative embodiment in which a metal interconnect 35 is present on a beam 34, wherein the metal interconnect 35 resides on top of field oxide 33.

Of particular importance to the design of out-of-plane sensors is the use of field oxide 33 and silicon core 31. These two components have different coefficients of thermal expansion. When grown at approximately 1150° C. field oxide 33 and silicon core 31 are substantially stress-free. When cooled to room temperature, silicon core 31 shrinks more than field oxide 33, thereby causing a radius of curvature 36 shown in FIG. 3D. FIG. 3E roughly approximates a downward deflection of a cantilever beam 39 comprising field oxide 33 and silicon core 31. The downward deflection can be determined based on radius of curvature 36 and the distance from a support location 37 that connects cantilever beam 39 to case 38. This downward deflection enables the creation of an out-of-plane, capacitance-based displacement transducer used in acceleration measurement. But before describing this transducer, the structure of a typical out-of-plane, or Z, accelerometer is described.

Overview of Out-of-Plane Accelerometers

FIG. 4 illustrates the basic components of common Z accelerometers. A proof mass 40 is connected to a torsion flexure 41. Torsion flexure 41 connects proof mass 40 to a substrate 43 through a support 44. A gap 46 is formed between proof mass 40 and an opposing parallel plate electrode 45. If this Z accelerometer is subjected to an acceleration in a direction parallel to the arrow of gap 46, proof mass 40 will deflect downwardly towards opposing parallel plate electrode 45. The deflected state of proof mass 40 is shown in phantom as deflected proof mass 47. A smaller gap 48 results between deflected proof mass 47 and opposing parallel plate electrode 45. The parallel-plate electrode 45 and proof mass 40 can form a capacitor that can be used to sense the motion of the proof mass 40 relative to substrate 43.

Z accelerometers that use parallel-plates for sensing proof mass motion such as the one shown in FIG. 4 are common within the sensor industry. Although the principle of operation is simple, the fabrication can be limited by the multiple layers required. One common fabrication method is to use two layers of polysilicon separated by an oxide layer. The upper polysilicon layer is used to form the flexure and the proof mass, while the lower layer is used to form the opposing parallel plate electrode. The proof mass is perforated to allow wet etching of the oxide layer to release the device and permit motion. One problem with this method includes stiction—a common problem with MEMS where the proof mass sticks to the opposing parallel-plate electrode. A second problem is associated with the small size of the proof-mass created using a deposited polysilicon layer. The amount of noise produced by a sensor is typically high with such a small proof mass. Higher performance Z accelerometers that utilize parallel-plates can be created using improved fabrication processes that utilize thick polysilicon depositions, thick layer epitaxial silicon growth, or silicon-on-insulator technologies; however, these processes are expensive to implement.

An example design for a Z accelerometer is shown in FIGS. 5A and 5B. The Z direction corresponds to the direction shown by arrow 50. This Z accelerometer includes a proof mass 51 connected to a support structure 55 via flexure 56. Opposing electrodes 52 are supported by support structure 58. While at rest, proof mass 51 is not level with opposing electrodes 52 as shown in FIG. 5B. Also shown in FIG. 5B is an area of overlap 53 between the area of proof mass 51 and the area of the opposing electrodes 52. Proof mass 51 is elevated along the direction 50 with respect to opposing electrodes 52. In response to an upward acceleration in the direction of arrow 50, proof mass 51 deflects downwardly towards a substrate 54. Consequently, area of overlap 53 increases. As area of overlap 53 increases so does the capacitance between proof mass 51 and electrodes 52, thereby forming a displacement transducer used in the sensing of acceleration.

It is crucial for the operation of capacitance sensing that the electrodes are not level while at rest. This is because if one used two level electrodes similar to electrodes 51 and 52, if electrode 51 were to move up or down by a small amount, the area of overlap would decrease equally in both situations. Given only a single capacitance measurement, it would be difficult to determine in which direction electrode 51 moved with respect to a fixed point. Based on electrostatic field theory, the ideal situation is where the electrodes start with a height mismatch of at least two to three times the gap that separates them.

Other methods for sensing out-of-plane acceleration are described in previously-referenced U.S. Pat. No. 6,792,804. For example, the capacitance can be measured between the silicon core of a beam 52 and an opposing metal layer disposed on beam 51. The opposing metal layer can be similar to metal interconnect 35 of FIG. 3. Although this works well, accelerometer designs that utilize metal within the sensing region can be prone to thermal offsets and offsets due to mechanical shock.

As mentioned above, FIG. 3 shows a design concept of a beam having a radius of curvature fabricated using plasma micromachining; whereas, FIG. 5 shows a design concept for a Z accelerometer that utilizes variable overlap capacitance sensing. The design concepts illustrated in FIGS. 3 and 5 can be combined to form a full Z accelerometer design 600 such as the one shown in FIG. 6. This basic accelerometer design includes a proof mass 101 that is free to move in a direction perpendicular to the plane of the page—that is, in a direction 100. This basic accelerometer design also includes a beam structure 111 having electrodes 115 extending therefrom. Beam structure 111 is rigidly connected to a substrate 122 (shown in FIGS. 7A and 7B) by a support structure 113 via a flexure 112.

Proof mass 101 moves torsionally about an axis defined by torsional flexure 102. Proof mass 101 has electrodes 105 and 106 interdigitated with corresponding electrodes 115 and 126. Electrodes 105 and 115 form a first capacitor. Electrodes 106 and 126 form a second capacitor. When proof mass 101 moves in and out of the plane of the page in response to an acceleration, the difference between the first and second capacitors provides a measure of the acceleration.

FIG. 7A shows a cross sectional view of the electrode structure along line A-A of FIG. 6. Electrode 126 is mechanically connected, but electrically isolated from a support 121 and a case 122. Because the support location is adjacent to the electrodes, little downward bow occurs due to the natural curvature of the beam structure. However, electrodes that extend off of proof mass 101 are a significant distance 108 or 109 away from their respective support structure 103 as shown in FIG. 6, and thus relatively more downward bow occurs. Therefore, the electrodes 106 that extend off of proof mass 101 are lower than electrodes 126 that extend from support 121. Likewise, electrodes 115 are lower than electrodes 105 because electrodes 115 are a greater distance 119 from their respective support structure 113 than distance 109—the distance that electrodes 105 are from their respective support structure 103. Distance 119 is greater than distance 109 because support structure 103 is spatially separated from support structure 113 by a distance 120.

Operation of the device shown in FIGS. 6, 7A, and 7B starts with proof mass 101. When no acceleration is applied, proof mass 101 lies between the heights of electrodes 126 and 115. Electrodes 106 and 126 have an area of overlap 136 while at rest and thereby form a capacitor C136. Electrodes 105 and 115 have an area of overlap 135 while at rest and thereby form a capacitor C135. The difference between capacitor C135 and capacitor C136 while at rest, denoted as C135-C136, is equal to a starting differential capacitance dC0. When subjected to an upward acceleration along z-axis 100, proof mass 101 deflects downwardly towards substrate 122 and area of overlap 135 increases while area of overlap 136 decreases. This change in areas of overlap results in a change in the differential capacitance C135-C136 referred to as dC1. The value of dC=dC1−dC0 is approximately proportional to the acceleration applied to the device.

A primary problem with the accelerometer depicted in FIG. 6 is that support structures 103 and 113 are significantly far away from support structure 121. The farther the separation between the support structures, the more the device will be susceptible to package stresses. As shown in FIG. 8, under a package stress, support structure 121 can move to a new location shown in phantom as structure 131. The net result is that quantity dC becomes package sensitive and can produce an acceleration measurement error. Package stresses can result from the reflow process used to solder electronic components to electronics boards. Another source of package stress can result from temperature changes. Since electronic components are made up of a variety of materials with different coefficients of thermal expansion, a change in temperature results in a change in package stress. Unfortunately, proper operation of the accelerometer design in FIG. 6 fundamentally depends on (i) the separation between support structure 103 and support structure 121 and (ii) the separation between support structure 113 and support structure 121. As mentioned above with respect to FIG. 7, due to this separation, electrodes 106 are offset lower than electrodes 126, and electrodes 115 are offset lower than electrodes 105, when the accelerometer is at rest.

One way to combat the sensitivity of the design in FIG. 6 to packaging stresses is to build a first sensor 980 and a second sensor 990 as shown in an example tri-axis accelerometer 900 of FIG. 9. In this design, second sensor 990 is used as a fixed reference, while first sensor 980 is configured to respond to accelerations along z-axis 100. Second sensor 990 is sensitive to temperature and package stress, but is not sensitive to accelerations. First sensor 980 is sensitive to acceleration, temperature, and package stress. By subtracting an output signal of second sensor 990 from an output signal of first sensor 980, the theory is that the package stress and temperature effects will be removed.

Details on how tri-axis accelerometer 900 works follow. First sensor 980 of tri-axis accelerometer 900 includes a proof mass 201 that responds to accelerations in the direction of Z-axis 100 by torsionally moving around a longitudinal axis of torsional flexure 202. The beam structure of proof mass 201 connects to a case (not shown) by a support structure 203 via torsional flexure 202. Electrodes 205 and 206 extend from proof mass 201 and interdigitate with electrodes 215 and 226, respectively. Electrodes 226 are connected to the case by support 221. Beam structure 211 is rigidly connected to the case by a support structure 213 via a flexure 212. Torsional flexure 212 is designed to be significantly stiffer than flexure 202. Due to the difference in stiffness, beam structure 211 will remain substantially stationary, whereas proof mass 201 will tend to move, when subjected to an acceleration. Nested inside first sensor 980 is an X accelerometer 298 that is designed to respond to accelerations along X axis 200.

Similarly, in second sensor 990, proof mass 251 connects to the case through a flexure 252 by a support structure 253. Electrodes 255 and 256 extend from proof mass 251 and interdigitate with electrodes 265 and 276, respectively. Electrodes 276 are connected to the case by support 271. A beam structure 261 is rigidly connected to the case by a support location 263 via a flexure 262. Torsional flexures 252 and 262 are designed to be relatively stiff. By having both flexures effectively rigid, second sensor 990 responds only to temperature and package stress, but not acceleration. Nested inside second sensor 990 is a Y accelerometer 299 that is designed to respond to accelerations along Y axis 300.

To sense a Z acceleration, electrical connections are made in such a way that the changes sensed by second sensor 990 are subtracted from those sensed by first sensor 980. One carrier is connected to electrodes 215 and 276. The other carrier is connected to electrodes 226 and 265. The charge is summed by connecting an ASIC charge input pin to proof masses 201 and 251. In other words, electrodes 205 and 215 form a capacitor Ca, electrodes 206 and 226 form a capacitor Cb, electrodes 255 and 265 form a capacitor Cc, and electrodes 256 and 276 form a capacitor Cd. The capacitance difference Cc-Cd sensed by second sensor 990 is subtracted from the capacitance difference sensed by first sensor 980 Ca-Cb. In this way, a signal is obtained that is proportional to acceleration, but not sensitive to temperature and package stress. Mathematically, this can be represented as dC=(Ca−Cb)−(Cc−Cd). Rearranging the terms yields dC=(Ca+Cd)−(Cb+Cc). The term dC should be package and temperature insensitive. Unfortunately, tri-axis accelerometer 900 is still temperature and package stress sensitive. The accelerometer design in FIG. 9 only combats uniform strain, where sensors 980 and 990 see the same temperature induced package strain. Any twisting of the element is not compensated for.

Example Tri-Axis Accelerometer Embodiments

FIGS. 10A and 11 illustrate example design concepts for tri-axis accelerometers in accordance with embodiments of the present invention. One significant difference between these designs and designs presented above is that the z-sense element halves are effectively supported at single points. By effectively supporting a z-sense element at a single point, output shifts due to package stresses and temperature changes are substantially reduced. Early experiments have shown approximately a 5× reduction in temperature sensitivity and a 10× reduction in package stress induced output shifts. In addition to the improvement in performance, the design concepts schematically illustrated in FIGS. 10A and 11 also have permitted a 40% reduction in area required for the sense element, effectively lowering the cost of production by a similar percentage.

Although the supports are described as "single point," the supports can have some small separation to allow for wiring or other features to pass between a sensing element and the (silicon) substrate. As used herein, a "single point" support structure refers to a support structure that encompasses an area substantially smaller than an area encompassed by an acceleration sensing device.

FIG. 10A illustrates an example tri-axis accelerometer 1000 in accordance with an embodiment of the present invention. Tri-axis accelerometer 1000 includes a first z-axis sensor 306, a second z-axis sensor 307, an x-axis accelerometer 398, and a y-axis accelerometer 399.

First z-axis sensor 306 is configured to measure an acceleration along z-axis 100, i.e., along an axis perpendicular to a plane of a case 310. As mentioned above, first z-axis sensor 306 may also be sensitive to temperature. First z-axis sensor 306 includes a first beam structure 301, a second beam structure 311 and a single support structure 303. Single support structure 303 supports first beam structure 301 and second beam structure 311 relative to case 310. First beam structure 301 includes a plurality of electrodes 305 and second beam structure 311 includes a plurality of electrodes 315. Electrodes 315 are interdigitated with and electrically coupled to electrodes 305. First beam structure 301 moves relative to second beam structure 311 in response to an acceleration along z-axis 100 causing a measurable change in the electrical coupling between electrodes 305 and electrodes 315.

X-axis accelerometer 398 is configured to measure an acceleration along x-axis 200, similar to accelerometer 202 of FIG. 2A. As shown in FIG. 10A, first beam structure 301 and second beam structure 311 circumscribe x-axis accelerometer 398.

Second z-axis sensor 307 is also configured to measure an acceleration along z-axis 100. As mentioned above, second z-axis sensor 307 may also be sensitive to temperature. Second z-axis sensor 307 includes a third beam structure 361, a fourth beam structure 351 and a single support structure 354. Similar to single support structure 303, single support structure 354 supports third beam structure 361 and fourth beam structure 351 relative to case 310. Third beam structure 361 includes a plurality of electrodes 365 and fourth beam structure 351 includes a plurality of electrodes 355. Electrodes 355 are interdigitated with and electrically coupled to electrodes 365. Third beam structure 361 moves relative to fourth beam structure 351 in response to an acceleration along z-axis 100 causing a measurable change in the electrical coupling between electrodes 365 and 355.

Y-axis accelerometer 399 is configured to measure an acceleration along y-axis 300, similar to accelerometer 202 of FIG. 2A. As shown in FIG. 10A, third beam structure 361 and fourth beam structure 351 circumscribe y-axis accelerometer 399.

As mentioned above, in an embodiment of the present invention first z-axis sensor 306 and second z-axis sensor 307 independently sense an acceleration along z-axis 100. However, in an alternative embodiment, first z-axis sensor 306 and second z-axis sensor 307 measure a differential capacitance to sense acceleration in a similar manner to that described above with reference to FIG. 6. An example operation of this embodiment is now described.

First z-axis sensor 306 includes a proof mass 301 that moves up and down in the Z direction 100 through a torsional motion about an axis defined by a torsional flexure 302. Flexure 302 connects proof mass 301 to the substrate at support structure 303. The opposing member of this half of the z element is beam structure 311. Beam structure 311 is connected to support structure 303 via a stiff flexure 312 so as to inhibit motion. If proof mass 301 and beam structure 311 were constructed in a manner similar to the design presented in FIG. 6, there would be little, if any, difference in the height of the electrodes 305 and 315. However, first z-axis sensor 306 of the design in FIG. 10A utilizes different field oxide thickness in region 316 overlapping structure 313 from the rest of the structure in order to achieve different curvatures between proof mass 301 and beam structure 311. The result is a bow difference between the electrode pairs 305 and 315. Similarly, second z-axis sensor 307 of the design in FIG. 10A utilizes different field oxide thickness in region 366 overlapping structure 363 from the rest of the structure in order to achieve different curvatures between beam structure 351 and proof mass 361. The result is a bow difference between the electrode pairs 355 and 365.

The process for creating different field oxide thicknesses (for example, in regions 313 and 363) can occur in many ways. FIGS. 10B through 10H illustrate an example process for creating different field oxide thicknesses.

Figure 10B:
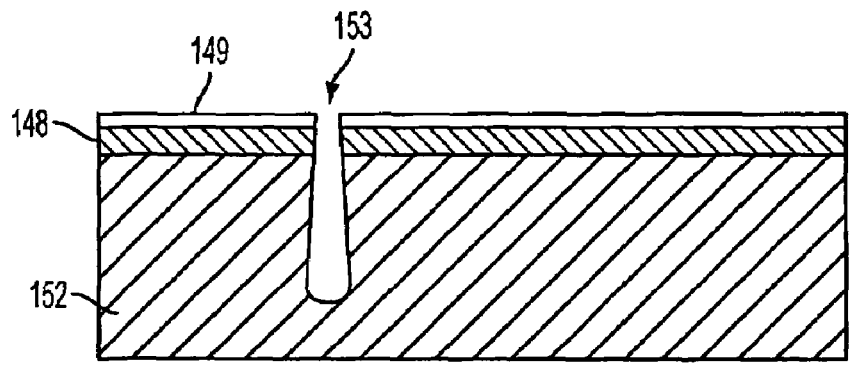
Figure 10C:
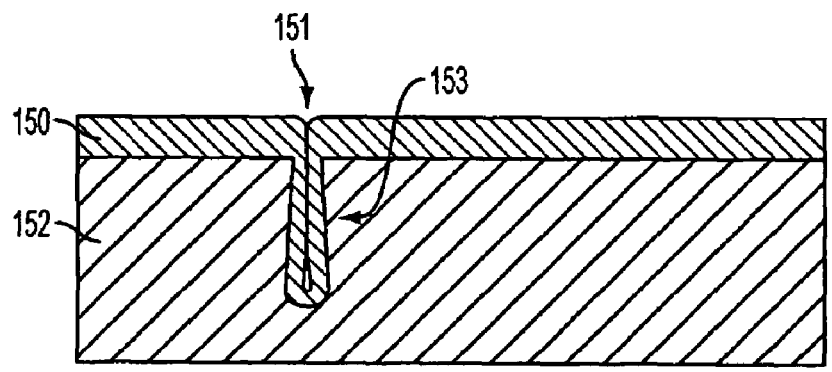
Figure 10D:
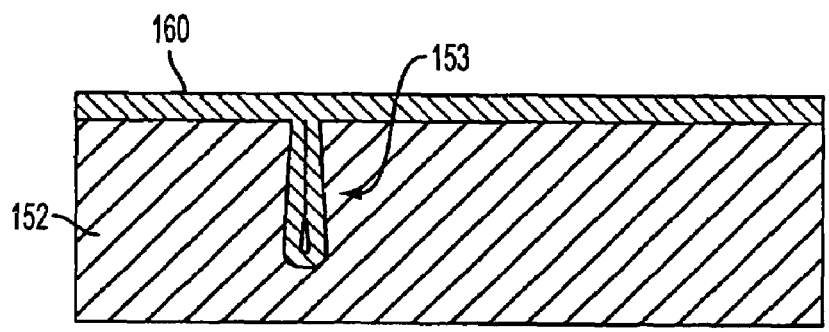

FIG. 10B illustrates a cross-sectional view of a (silicon) substrate 152 having a layer of silicon dioxide 148 disposed thereon, wherein a photo-resist layer 149 is disposed on the silicon dioxide 148. A trench isolation joint 153 is etched into (silicon) substrate 152, for example, by using a process as described in the above-mentioned U.S. Pat. Nos. 6,342,430 and 6,239,473. As shown in FIG. 10C, a thick field oxide layer 150 is thermally grown to fill trench isolation joint 153. In an embodiment, the growth of silicon dioxide is approximately 2.2 μm thick. As shown in FIG. 10D, a planarization process can then be used to smooth over cusp 151 created at trench isolation joint 153 as well as to set the starting field oxide thickness 160 for the formation of the MEMS structural elements. Typical starting field oxide thicknesses are in the range of approximately 0.8 to 1.2 μm to form a silicon structure approximately 20 to 30 μm tall. At this point in the process, all of the structures have the same starting field oxide thickness.

Figure 10E:
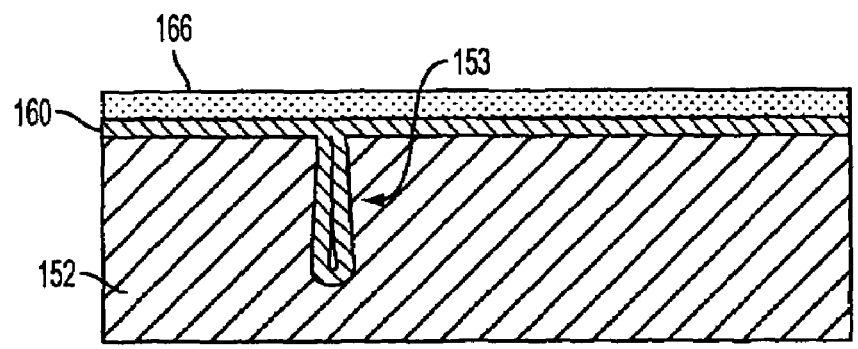

As described in the above-referenced patents, the process calls for the formation of electrical vias to the substrate material, metallization to form the interconnects, and the deposition of a passivation oxide to a thickness of approximately 1 to 1.5 μm. Deposition of a passivation oxide 166 is shown in FIG. 10E. The stress of this passivation oxide as deposited can range from approximately +30 MPa tensile stress to approximately −100 MPa compressive stress. A typical value chosen is approximately −70 MPa compressive. The more negative the stress level, the more outer beam structures 311 and 361 will bow.

Figure 10F:
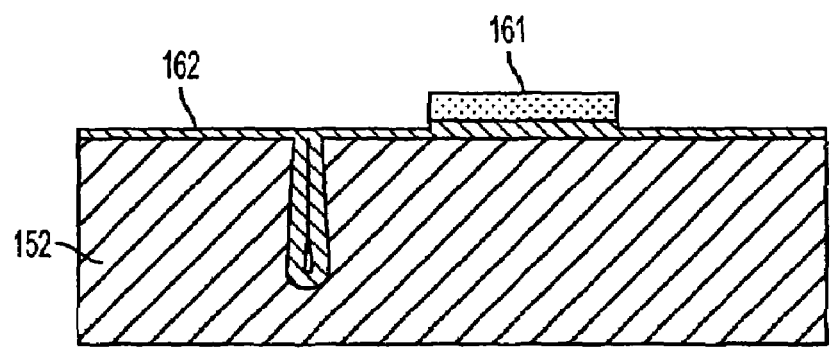
Figure 10G:
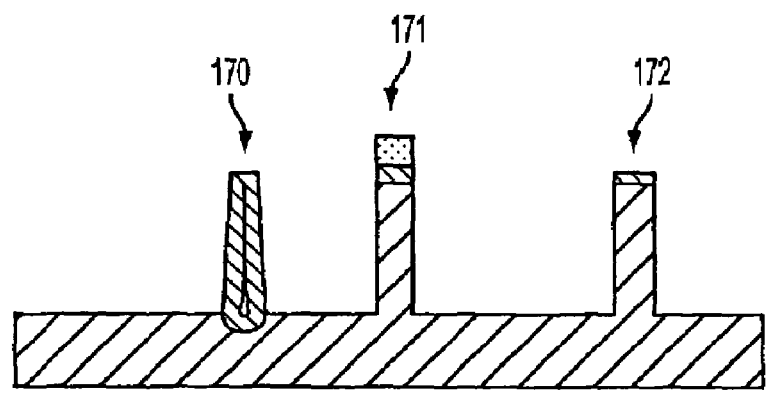

Typically, the passivation oxide is uniformly removed within the trench region where the MEMS structural elements reside. However, as shown in FIG. 10F, all of passivation oxide layer 166 is removed except for a region 161 exposing a layer of field oxide 162. Due to the removal process, field oxide layer 162 is thinner than field oxide layer 160. As shown in FIG. 10G, a trench isolation joint 170 is etched from substrate 152. Also shown in FIG. 10G is a beam 171 etched from the excess passivation oxide region 161 and a beam 172 formed outside of excess passivation oxide region 161. In this way, beam 171 will have a thicker layer of passivation oxide than beam 172, and therefore beam 171 will bow more than beam 172, as described above.

For example, the passivation oxide may be removed from all regions except regions 316 and 366 that completely overlap structures 313 and 363, respectively, in FIG. 10A. In this way, structures 313 and 363 will have a thicker layer of oxide compared to other portions of tri-axis accelerometer 1000 included within trench region 310, for example, structures 304 and 354 of inner beam structures 301 and 351, respectively. During the passivation removal process approximately 400 run of additional oxide is etched in order to thin the field oxide 162 over all the structural elements except structures 313 and 363. During the remaining process steps the exposed field oxide and the passivation oxide are thinned by another approximately 400 nm due to the selectivity of the plasma etching when the silicon is etched. In an embodiment, the maximum bow of outer beam structures 311 and 361 is approximately 14 to 18 μm, while the maximum bow of inner beam structures 301 and 351 is approximately 7 to 10 μm.

Figure 10H:
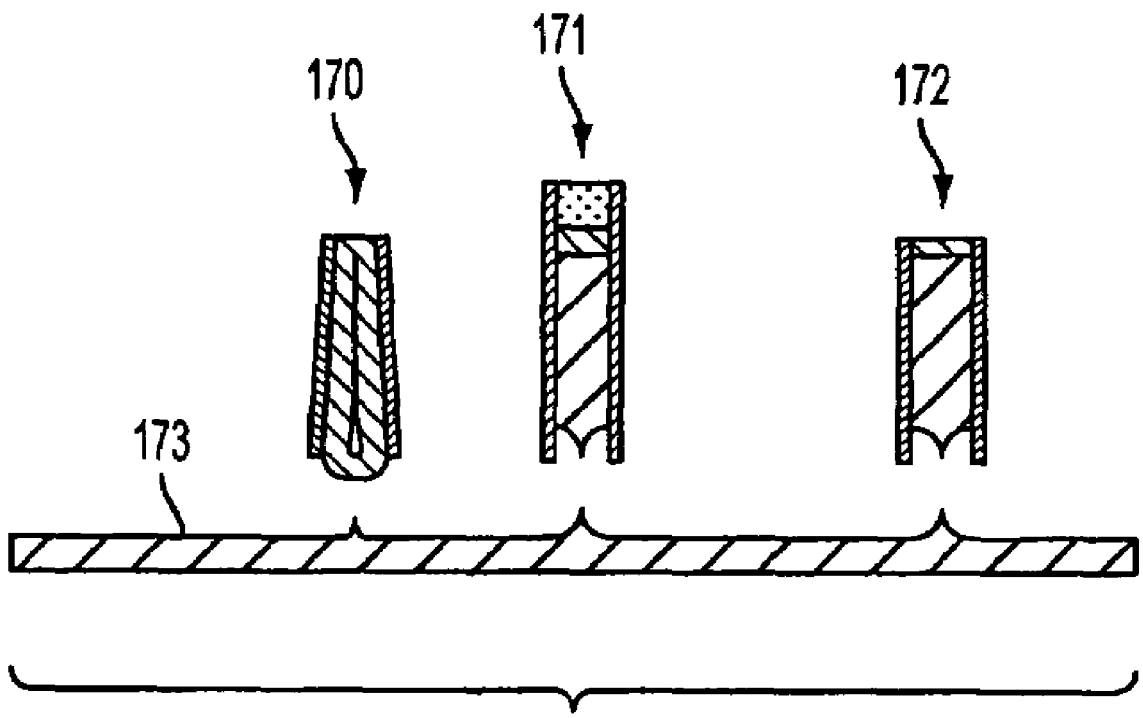

As shown in FIG. 10H, an isotropic etch is used to release trench isolation joint 170, beam 171 and beam 172 from (silicon) substrate 173.

There are other methods of achieving the desired oxide stacks in order to produce the appropriate bow. For example, one could pattern the field oxide immediately after the 2.2 μm oxide growth. The patterning would introduce the desired 600 mn step in the oxide thickness. In addition, the planarization step used to produce the desired field oxide thickness would smooth the transition between the two regions.

Referring again to FIG. 10A, second z-axis sensor 307 includes a proof mass 361, the outer beam structure. Proof mass 361 is connected to the substrate at support structure 354 via a torsional flexure 362. Beam structure 351 is connected to support structure 354 via a stiff flexure 352 so as to inhibit motion. Motion of proof mass 361 is in-and-out of the plane in the Z direction 100. Proof mass 361 bows more than beam structure 351 because oxide region 363 disposed on proof mass 361 is thicker than an oxide region 354 disposed on beam structure 351.

Electrodes 305 and 315 form a capacitor CL, wherein electrodes 305 are above electrodes 315 in the Z direction 100 when proof mass 301 is at rest. Electrodes 355 and 365 similarly form another capacitor CR, wherein electrodes 355 are above electrodes 365 when proof mass 361 is at rest. In the event of an upward acceleration in the Z direction 100, inner electrodes 305 will deflect downwardly thereby increasing the capacitance CL; whereas, outer electrodes 365 will deflect downwardly thereby decreasing the capacitance CR. By electrically connecting carrier 1 to electrodes 315, carrier 2 to electrodes 365, and connecting both electrodes 305 and 355 to the charge input, the differential capacitance (CR–CL)=dC can be measured. dC is proportional to the Z direction acceleration experienced by accelerometer 1000.

In the event of a temperature change, proof mass 301 and beam structure 311 of first z-axis sensor 306 should track the motion of beam structure 351 and proof mass 361 of second z-axis sensor 307. Therefore temperature changes should have little effect on the output response of the Z accelerometer. In addition, proof mass 301 and beam structure 311 share a common support location 303; similarly, beam structure 351 and proof mass 361 share a common support location 354. Therefore packaging stresses should also have little effect on the output of the Z accelerometer.

X accelerometer 398 and Y accelerometer 399 are nested within first z-axis sensor 306 and second z-axis sensor 307, respectively, as shown in FIG. 10A. That is, proof mass 301 and beam structure 311 of first z-axis sensor 306 circumscribe X accelerometer 398, and beam structure 351 and proof mass 361 of second z-axis sensor 307 circumscribe Y accelerometer 399. It is to be appreciated, however, that the arrangement shown in FIG. 10A is for illustrative purposes only, and not limitation. Other arrangements are contemplated within the scope of the present invention. For example, X accelerometer 398 could be nested in second z-axis sensor 307, Y accelerometer 399 could be nested in first z-axis sensor 306, or some other arrangement could be realized as would be apparent to a person skilled in the relevant art(s) from reading the description contained herein.

Typical linear accelerometers used for sensors 398 and 399 are similar to the accelerometer presented in FIG. 2. X sensor 398 and Y sensor 399 are connected to the substrate in two diametrically opposing locations (not shown). Although detrimental to the performance of Z sensors 306 and 307, having diametrically opposing supports is not significantly detrimental to the performance of X and Y sensors 398 and 399 due to the symmetry of the structure. Any relative motion between the two supports manifests itself as an insignificant motion of the proof mass because the restoring springs are typically balanced.

Typical values relevant to the operation of Z sensor 1000 shown in FIG. 10A include a resonance in the range of approximately 1 to 3 kHz, a second moment of inertia of approximately 2 to $3 \times 10^{-3}$ kg-m², an oscillator quality factor of approximately 0.5 to 1.5, and a differential capacitance change of approximately 3 to 10 fF of change per g of acceleration. Typical values relevant to the operation of the X and Y sensors include resonances in the range of approximately 3 to 5 kHz, a mass of approximately 6 to $10 \times 10^{-9}$ kg, an oscillator quality factor of approximately 0.5 to 1.5, and a differential capacitance change of approximately 3 to 10 fF of change per g of acceleration.

FIG. 11 illustrates an alternate embodiment of tri-axis accelerometer 1100, wherein even the X and Y sensors are supported above the substrate effectively at a pair of single point support regions. Tri-axis accelerometer 1100 includes a first z-axis sensor 406 and a second z-axis sensor 407. In an embodiment, first z-axis sensor 406 and second z-axis sensor 407 can independently sense an acceleration along z direction 100. In an alternative embodiment, first z-axis sensor 406 and second z-axis sensor 407 can function to measure a differential capacitance.

As shown in FIG. 11, beam structure 401 and beam structure 411 of first z-axis sensor 406 circumscribe an x-sensor 498. X-sensor 498 is configured to measure an acceleration in the direction of X-axis 200. Similarly, beam structures 451 and 461 of second z-axis sensor 407 circumscribe a y-sensor 499. Y-sensor 499 is configured to measure an acceleration in the direction of Y-axis 300. Extending from beam structure 401 are electrodes 405, which interdigitate with electrodes 415 extending from beam structure 411. Similarly, extending from beam structure 451 are electrodes 455, which interdigitate with electrodes 465 extending from beam structure 461.

First z-axis sensor 406 and x-sensor 498 are supported above a case 410 by support structure 403. Similarly, second z-axis sensor 407 and y-sensor 499 are supported above case 410 by support structure 453. Beam structure 411 of first z-axis sensor 406 has a greater downward curvature than beam structure 401 because region 413 of beam structure 411 has a relatively thick oxide layer whereas region 404 of beam structure 401 does not. Similarly, beam structure 461 has a greater downward curvature than beam structure 451 because region 463 of beam structure 461 has a relatively thick oxide layer whereas region 454 of beam structure 451 does not.

First z-axis sensor 406 includes beam structure 401 and a torsional flexure 402. Instead of connecting beam structure 401 directly to the support structure 403, torsional flexure 402 connects to a tee support 412 via a tee connector 420. Beam structure 401 can serve as a proof mass for first z-axis sensor 406. In addition, X accelerometer 498 makes up a significant percentage of the Z accelerometer's proof mass. Although beam structure 401 moves up and down in response to Z acceleration, the relative motion is small enough as to not introduce any significant cross-axis sensitivities in the X accelerometer 498.

Second z-axis sensor 407 includes beam structure 451 and a torsional flexure 452. Instead of connecting beam structure 451 directly to the support structure 453, torsional flexure 452 connects to a tee support 462 via a tee connector 470.

In second z-axis sensor 407, beam structures 451 and 461 swap functions with respect to beam structures 401 and 411 of first z-axis sensor 406. In second z-axis sensor 407, beam structure 461 is the proof mass and beam structure 451 includes the opposing fixed electrodes. The function swap is made possible by the relative difference in position of tee connector 470 compared to tee connector 420. Y accelerometer 499 is nested within second z-axis sensor 407 to minimize the cross axis sensitivity to accelerations in the Z direction. If Y accelerometer 499 were placed in the location of X accelerometer 498, a Z acceleration would cause the tilt of beam structure 401 to change and in turn would change the initial tilt of Y accelerometer 499 and introduce a cross-axis sensitivity.

A primary benefit of the design concept presented in FIG. 11 is a reduction in space required. The frame around X accelerometer 498 and Y accelerometer 499 are integral with the design of the inner beam structures 401 and 451 of first z-axis sensor 406 and second z-axis sensor 407, respectively. No substrate connections for X accelerometer 498 and Y accelerometer 499 are needed within the device core. That is, X accelerometer 498 and Y accelerometer 499 are only connected to the substrate at the periphery via support structures 403 and 453, respectively.

A drawback to this design concept is that more metal and isolation joints are necessary in order to realize the electrode interconnect design. Metal on top of silicon beams can cause offset shifts with sensor elements due to plastic deformation of the metal resulting from shock events. Isolation joints introduce material with a significantly different coefficient of thermal expansion (CTE) from the silicon substrate. This differing CTE can, if not properly planned for, introduce large temperature sensitivities in sensors. The extent of the metal and isolation joint use will be more apparent in the figures that follow.

FIGS. 2 through 11 primarily show the design concepts in a simplified form to simplify the discussion. FIGS. 12-19 show a preferred embodiment of the design layouts for the design concepts shown in FIGS. 10 and 11. In particular, FIGS. 12-15 illustrate a preferred embodiment of the layout for the design concept schematically shown in FIG. 11; whereas, FIGS. 16-19 illustrate a preferred embodiment of the layout for the design concept schematically shown in FIG. 10.

Figure 12:
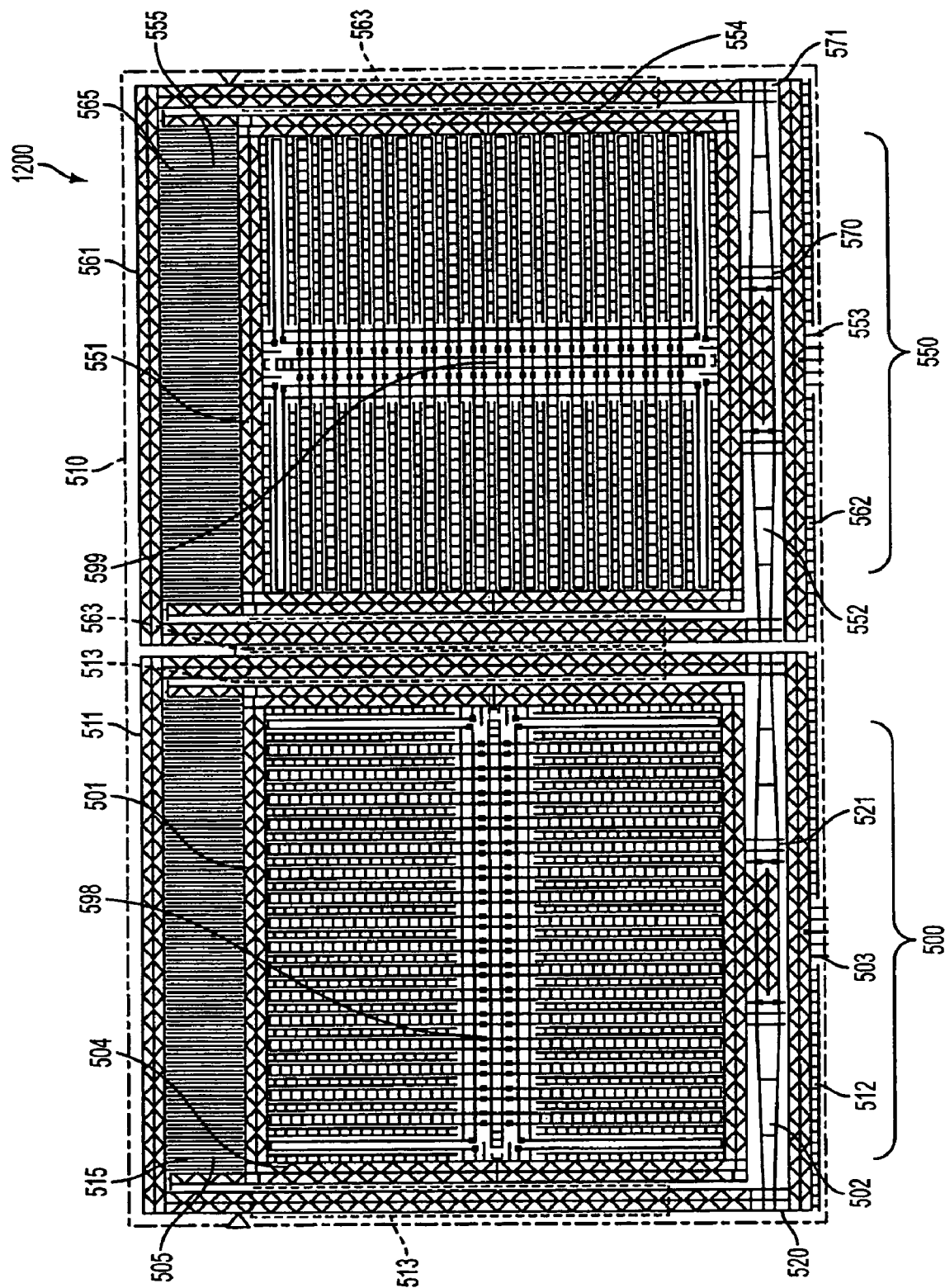

Referring to FIG. 12, a trench area 510 bounds the entire tri-axial accelerometer sensor element 1200. The only support connection to the substrate is at support structures 503 and 553. At each support location, six beams can connect to the substrate. However, a different number of beams can connect to the substrate without deviating from the spirit and scope of the present invention. In an embodiment, the six beams correspond with two carriers, three charge input lines, and a ground connection.

First element portion 500 includes half of a Z accelerometer and all of an X accelerometer. In first element portion 500, beam structure 501 is a proof mass for the z sensor half. Beam structure 501 circumscribes X sensor 598, which includes a frame 504. Beam structure 501 torsionally pivots about a flexure 502 in response to Z accelerations.

X accelerometer 598 is similar in concept to the linear accelerometer shown in FIG. 2. Accelerometer 598 includes a proof mass that moves in the direction of the X axis in response to an X acceleration. Motion of the proof mass is sensed using a plurality of parallel plate capacitor sensors. These sensors utilize carriers 1 and 2 as well as a charge-input terminal for sensing the motion of the proof mass, as described above.

Electrodes 505 are connected to the Z accelerometer proof mass 501. A beam structure 511 comprises opposing electrodes 515 for sensing motion of proof mass 501. Beam structure 511 directly connects to support structure 503 via tee connector 520. Structure 501 connects to flexure 502, then to tee connector 520 and support structure 503. Bow differential between electrodes 505 and 515 arises because of a region 513 of increased field oxide on beam structure 511 to enhance bow relative to the rest of the structure within first element portion 500.

Similarly, a second element portion 550 includes the remaining half of a Z accelerometer and all of a Y accelerometer 599. In second element portion 550, a beam structure 561 is a proof mass for the z sensor half. A beam structure 551 circumscribes Y sensor 599, which includes a frame 554. Beam structure 561 torsionally pivots about a flexure 552 in response to Z accelerations.

Y accelerometer 599 is also similar in concept to the linear accelerometer shown in FIG. 2. Accelerometer 599 includes a proof mass that moves in the direction of the Y axis in response to a Y acceleration. Motion of the proof mass is sensed using a plurality of parallel plate capacitor sensors. These sensors utilize carriers 1 and 2 as well as a charge-input terminal for electrically sensing the motion of the proof mass, as described above.

Electrodes 565 are connected to the Z accelerometer proof mass 561. Beam structure 551 comprises opposing electrodes 555 for sensing motion of proof mass 561. Instead of connecting beam structure 561 directly to the support structure 553, torsional flexure 552 connects to a tee support 562 via a tee connector 570. In contrast, structure 571 is not connected to tee support 562. Bow differential between electrodes 565 and 555 arises because of a region 563 of increased field oxide to enhance bow relative to the rest of the structure within second element portion 550.

Electrodes 505 and 515 form a capacitor C51 that increases with an applied acceleration in the Z direction. Electrodes 565 and 555 form a capacitor C52 that decreases with an applied acceleration. By taking the difference between C52 and C51, applied acceleration can be measured. In addition, as mentioned above, capacitors C51 or C52 can be used independently to form a Z accelerometer. All that is required is to create a fixed capacitor reference within the circuitry used to transduce the capacitance change into an acceleration. This method of constructing, an accelerometer with only one half of the Z sensor described is possible, but the fixed capacitor reference may not necessarily track that of the sensor in response to shifts in temperature.

Figure 13:
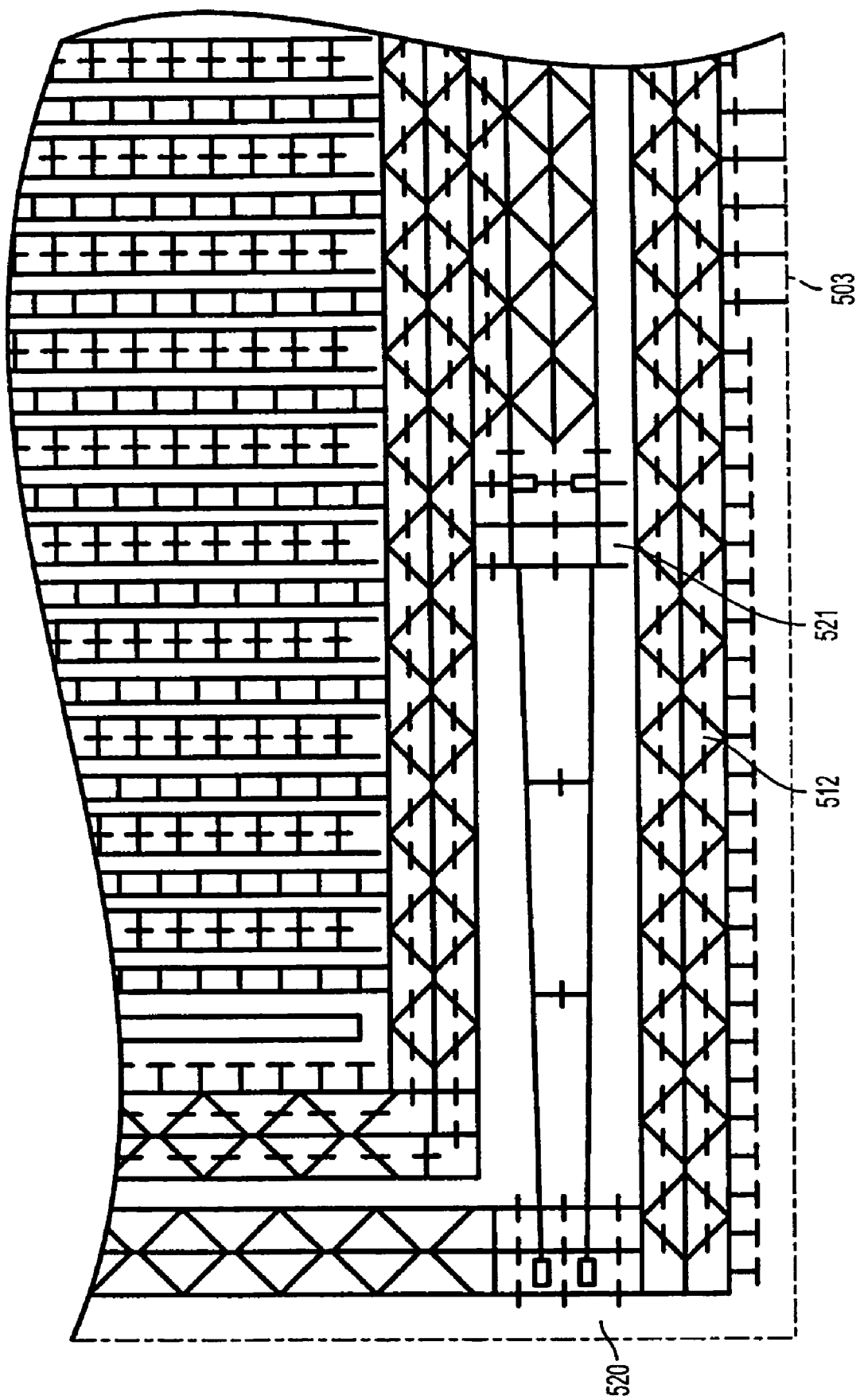

FIG. 13 shows details of tee support structure 520 included in first element portion 500. Tee connector 520 inhibits motion of beam structure 511; whereas the lack of a tee connection by structure 521 allows beam structure 501 to move in response to an acceleration. Also visible in FIG. 13 is a support structure 503 between the tee support 512 and the substrate. All electrical connections to the sensor elements included within first element portion 500 may take place across support structure 503. Similarly, all electrical connections to the sensor elements included within second element portion 550 may take place across support structure 553.

Figure 14:
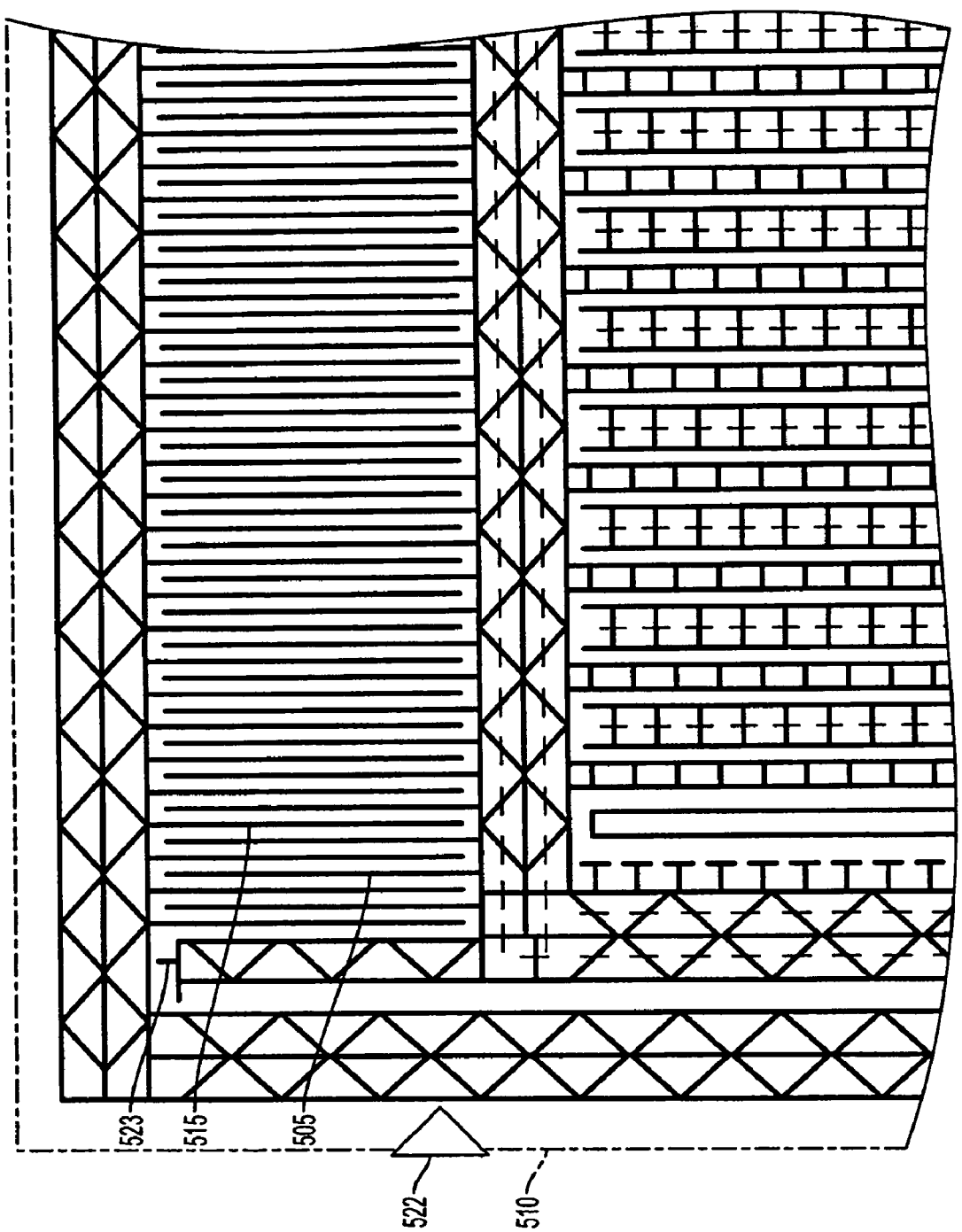

FIG. 14 shows details of the electrode region of first element portion 500. Shown are the plurality of electrodes 505 and 515. Electrodes 505 and 515 are approximately 100 μm long and spaced apart by approximately 3 μm. In addition, bump stops 523 and 522 provide protection in the event of exposure to high shock events. Boundary 510 shows where the trench region begins.

Figure 15:
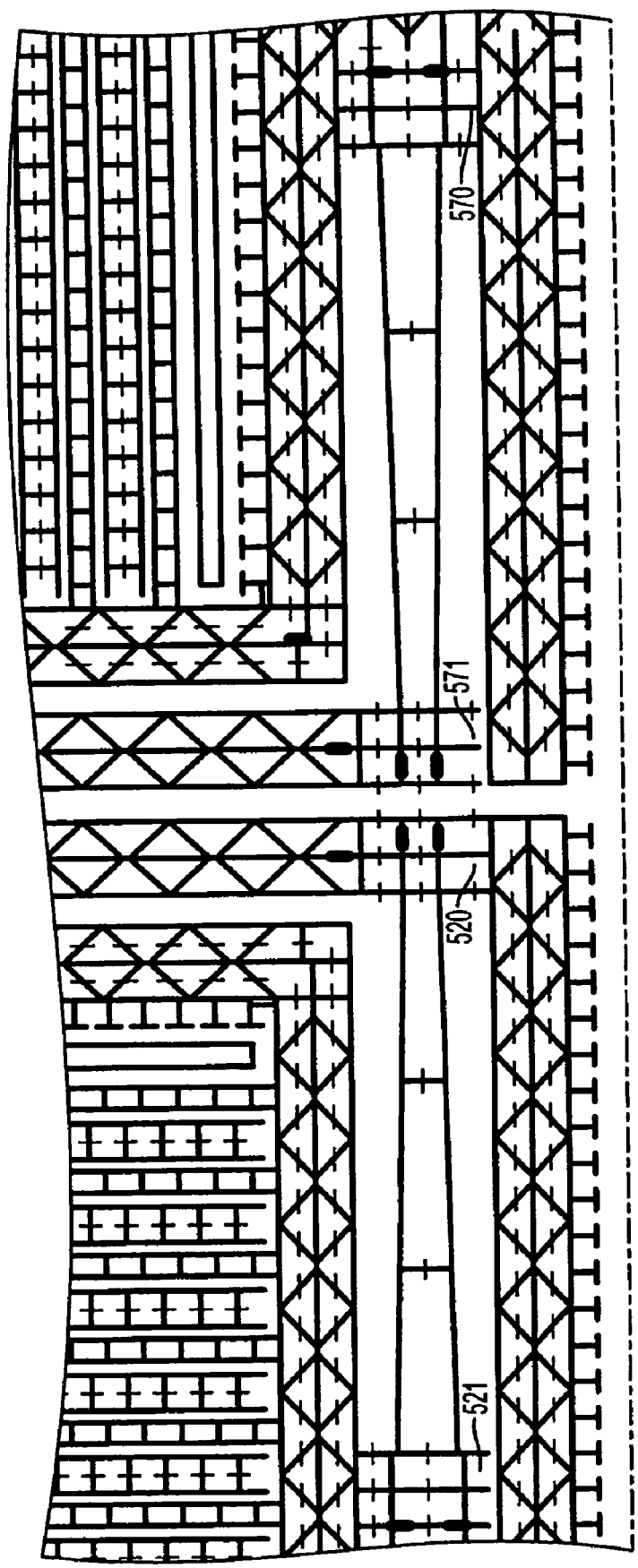
Figure 16:
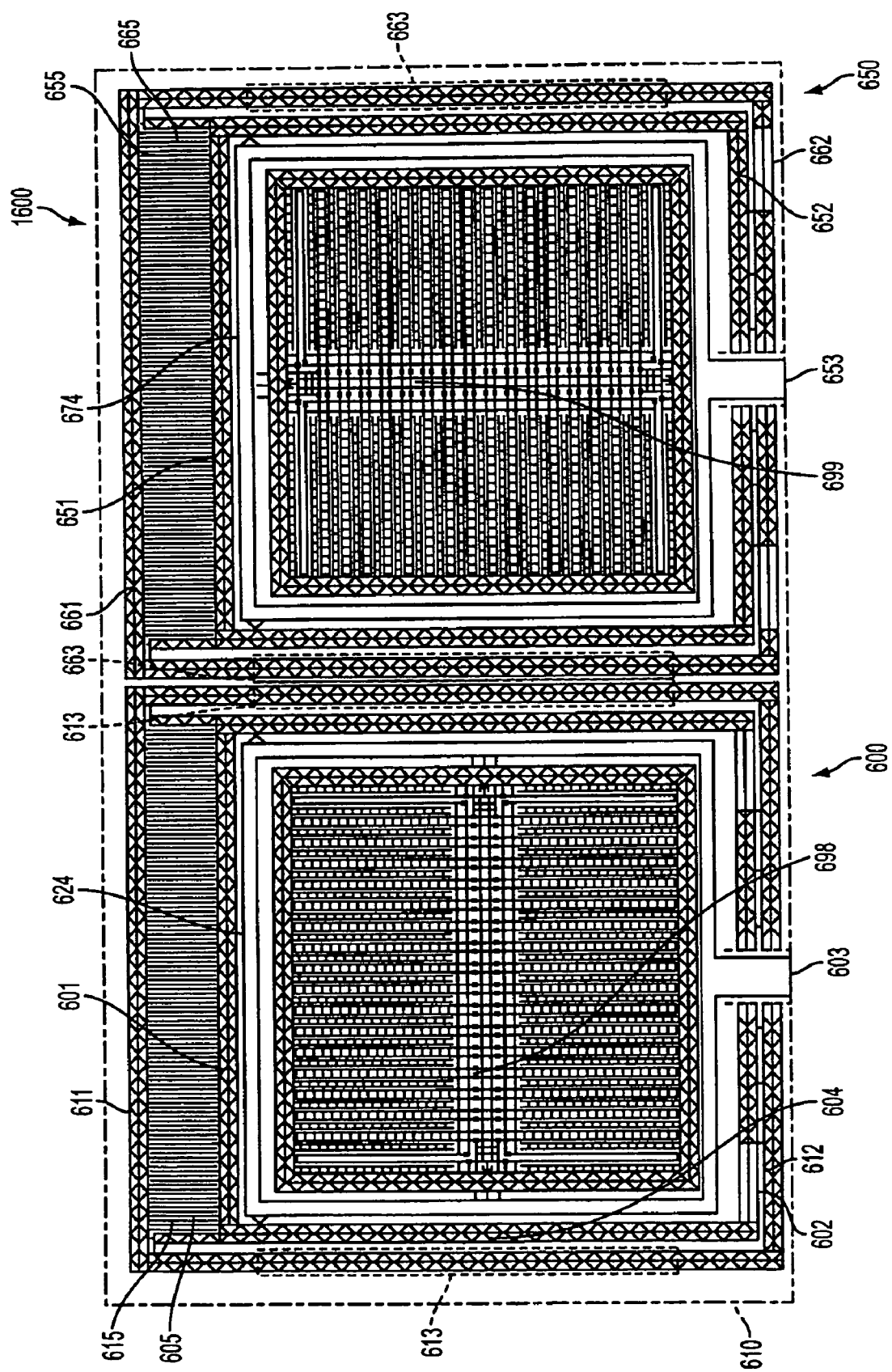

FIG. 15 further highlights the presence of tee connectors 520 and 570 and the absence of tee connectors at the locations of structures 521 and 571.

FIGS. 16 through 19 detail the design concept of a tri-axis accelerometer 1600 schematically illustrated as tri-axis accelerometer 1000 in FIG. 10A. Tri-axis accelerometer 1600 includes a first element portion 600 and a second element portion 650. The structures within first and second element portions 600 and 650 are bounded by a trench region 610. Connections between the Z accelerometer halves and the substrate occur at the support structures 603 and 653; whereas, connections between the substrate and the X and Y sensors occur at diametrically opposing locations within support frames 624 and 674. In an embodiment, support frames 624 and 674 are constructed from a truss structure of released silicon beams and connected to the substrate at support structures 603 and 653, respectively. In another embodiment, support frames 624 and 674 are uniformly connected to the underlying substrate.

First element portion 600 includes half of a Z accelerometer and all of an X accelerometer. In first element portion 600, beam structure 601 is a proof mass for the z sensor half. Beam structure 601 circumscribes an X sensor 698, which includes a frame 604. Beam structure 601 torsionally pivots about a flexure 602 in response to Z accelerations. A beam structure 611 of first element portion 600 is not compliant because of the design of a stiff torsional flexure 612 that restricts motion of beam structure 611 in response to Z acceleration.

X accelerometer 698 is similar in concept to linear accelerometer 202 shown in FIG. 2. Accelerometer 698 includes a proof mass that moves in the direction of the X axis in response to X acceleration. Motion of the proof mass is sensed using a plurality of parallel plate capacitor sensors. These sensors utilize carriers 1 and 2 as well as a charge-input terminal for sensing the motion of the proof mass.

Electrodes 605 are connected to the Z accelerometer proof mass 601. Beam structure 611 comprises opposing electrodes 615 for sensing motion of proof mass 601. Bow differential between electrodes 605 and 615 arises because of a region 613 of increased field oxide on beam structure 611 to enhance bow relative to the rest of the structure within 600.

Similarly, second element portion 650 includes the remaining half of a Z accelerometer and all of a Y accelerometer. In second element portion 650, a beam structure 661 is a proof mass for the z sensor half. A beam structure 651 of second element portion 650 circumscribes a Y sensor 699. Beam structure 661 torsionally pivots about flexure 662 in response to Z accelerations. Beam structure 651 of second element portion 650 is not compliant because of the design of a stiff torsional flexure 652 that restricts motion of beam structure 651 in response to Z acceleration.

Y accelerometer 699 is also similar in concept to linear accelerometer 202 shown in FIG. 2. Accelerometer 699 includes a proof mass that moves in the direction of the Y axis in response to Y acceleration. Motion of the proof mass is sensed using a plurality of parallel plate capacitor sensors. These sensors utilize carriers 1 and 2 as well as a charge-input terminal for electrically sensing motion of the proof mass.

Electrodes 665 are connected to the Z accelerometer proof mass 661. Beam structure 651 comprises opposing electrodes 655 for sensing motion of proof mass 661. Bow differential between electrodes 665 and 655 arises because of a region 663 of increased field oxide on beam structure 661 to enhance bow relative to the rest of the structure within second element portion 650.

Electrodes 605 and 615 form a capacitor C61 that increases with an applied upward acceleration in the Z direction. Electrodes 665 and 655 form a capacitor C62 that decreases with an applied upward acceleration. By taking the difference between C62 and C61, an applied acceleration can be measured. In addition, capacitors C61 or C62 can be used independently to form a Z accelerometer. All that is required is to create a fixed capacitor reference within the circuitry used to transduce the capacitance change into an acceleration. This method of constructing an accelerometer with only one half of the Z sensor described is possible, but the fixed capacitor reference may not necessarily track that of the sensor in response to shifts in temperature.

In all of the Z accelerometers described based on FIGS. 10, 11, 12 and 16, capacitance sensing of the proof mass is accomplished using differential bow. It is possible to create all of these Z accelerometers without using differential bow as described in U.S. Pat. No. 6,792,804. However, this method of sensing out-of-plane motion may require additional metal routing and isolation joints which could reduce performance of the Z sensor over varying temperature.

Figure 17:
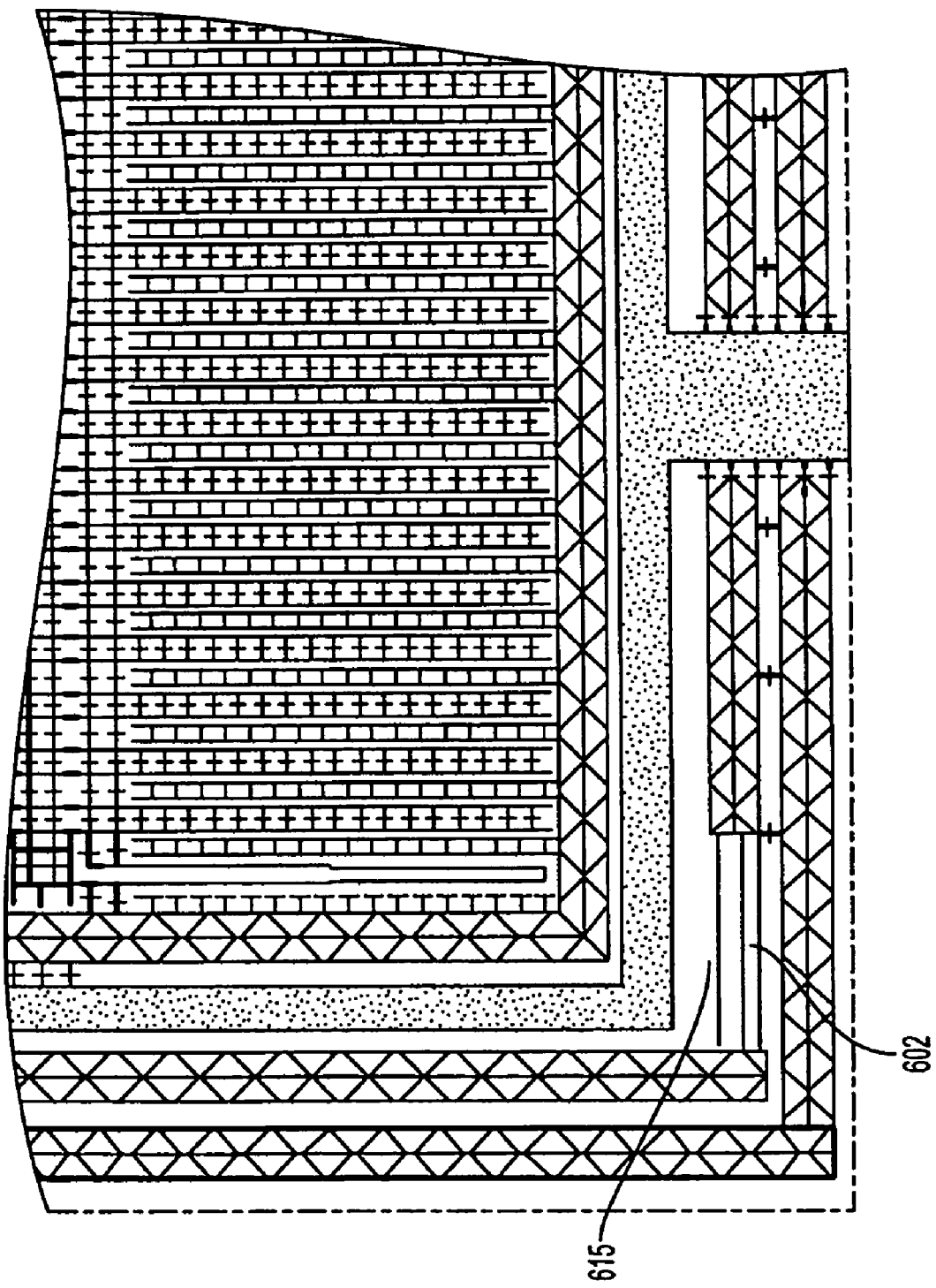

FIG. 17 shows the detail of the torsional flexure 602. Also shown is a beam 615 used to balance the etch loading for fabrication uniformity reasons.

Figure 18:
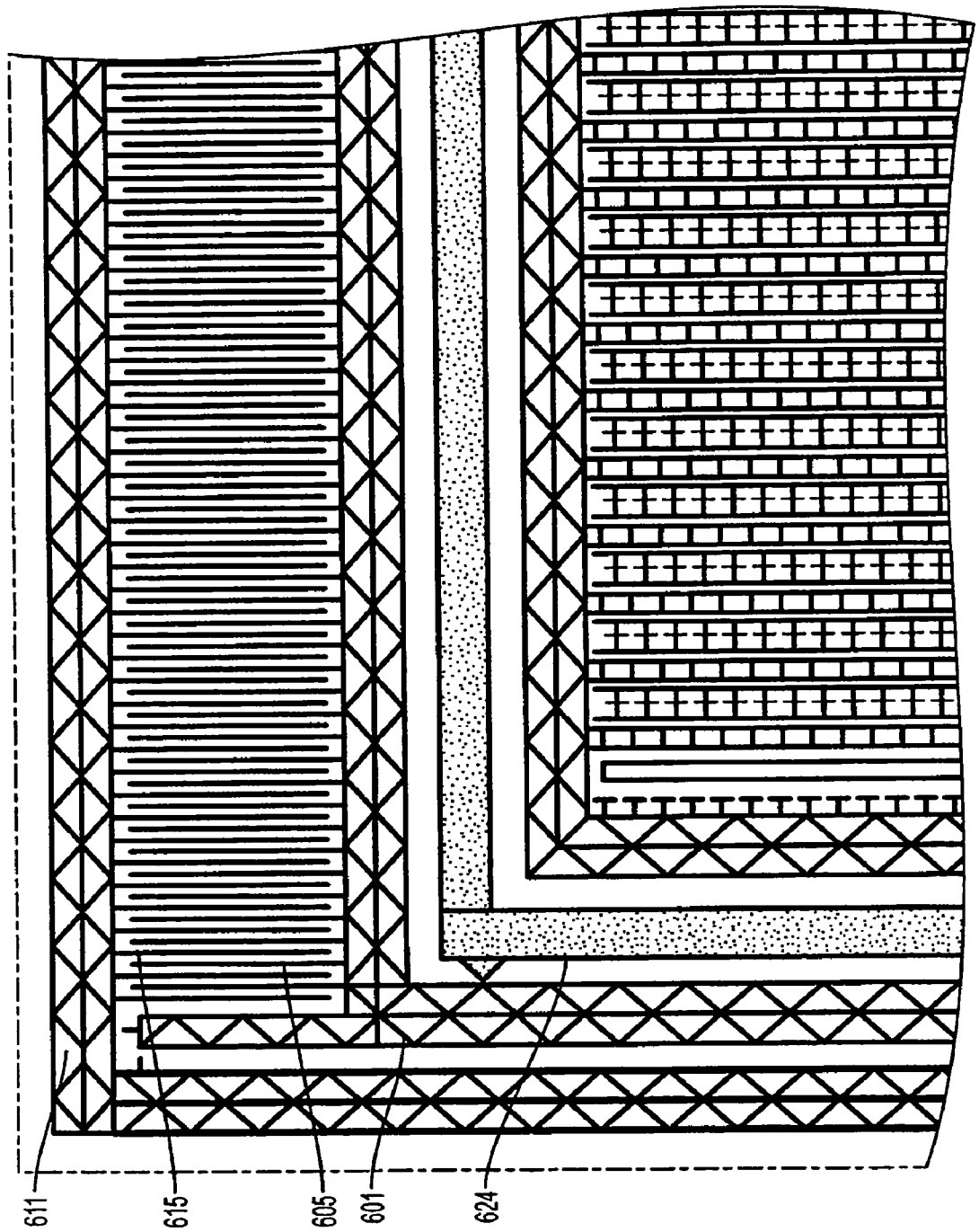

FIG. 18 shows details of the electrode region of first element portion 600. Shown are the plurality of electrodes 605 and 615 that extend from proof mass 601 and beam structure 611, respectively. Electrodes 605 and 615 are approximately 100 μm long and spaced apart by approximately 3 μm. In addition, structure of support frame 624 is shown.

Figure 19:
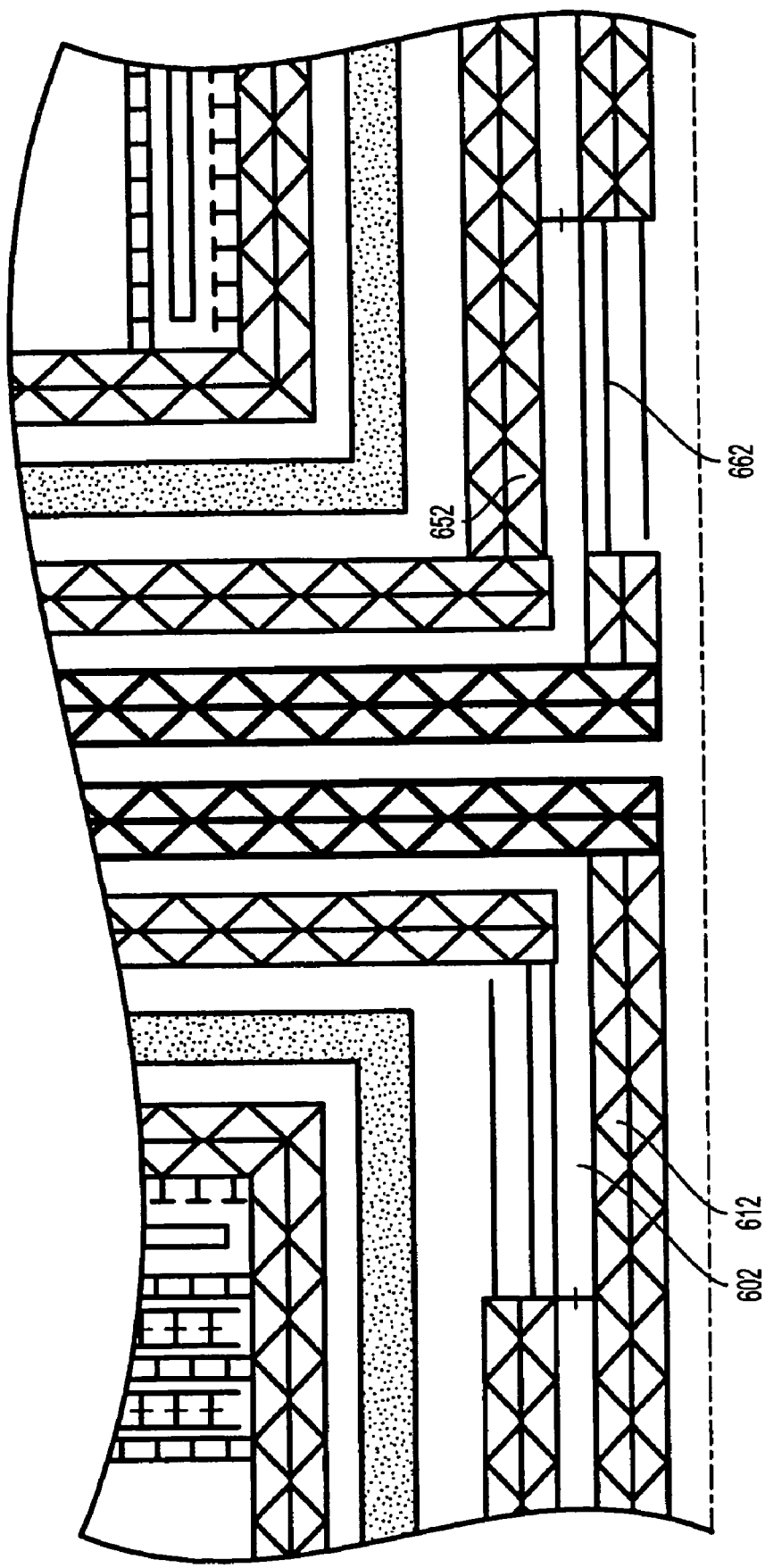

FIG. 19 further highlights how torsional flexure 602 and stiff torsional flexure 612 of first element portion 600 are similar to a torsional flexure 662 and a stiff torsional flexure 652, respectively, of second element portion 650.

An Example Method

FIG. 20 depicts a flowchart 2000 illustrating a method for configuring a micro-electromechanical accelerometer in accordance with an embodiment of the present invention. Flowchart 2000 begins at a step 2010 in which an out-of-plane sensor is manufactured such that it is supported relative to a substrate by a single support structure. For example, the out-of-plane sensor used in step 2010 may be similar to any of the out-of-plane sensors described above with respect to FIGS. 10A and 11-19.

In a step 2020, an in-plane sensor is circumscribed by the out-of-plane sensor. For example, the in-plane sensor used in step 2020 may be similar to any of the in-plane sensors described above with respect to FIGS. 2A, 10A and 11-19.

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A micro-electromechanical accelerometer, comprising:
    a substrate;
    a first sensor configured to measure an acceleration along a first axis parallel to a plane of the substrate; and
    a second sensor configured to measure an acceleration along an axis perpendicular to the plane of the substrate, wherein the second sensor comprises a first beam, a second beam and a single support structure, wherein the single support structure supports the first and second beams relative to the substrate, and wherein the first and second beams circumscribe the first sensor.

2. The micro-electromechanical accelerometer of claim 1, wherein the acceleration along the first axis is measured based on a differential capacitance among electrodes of the first sensor.

3. The micro-electromechanical accelerometer of claim 1, wherein the second sensor is configured to measure the acceleration along the axis perpendicular to the plane of the substrate based on an electrical coupling between the first and second beams.

4. The micro-electromechanical accelerometer of claim 3, wherein the first beam moves relative to the second beam in response to the acceleration along the axis perpendicular to the plane of the substrate causing a measurable change in the electrical coupling between the first and second beams.

5. The micro-electromechanical accelerometer of claim 4, wherein the first beam is pliably mounted to the single support structure and the second beam is rigidly mounted to the single support structure.

6. The micro-electromechanical accelerometer of claim 5, wherein the first sensor is supported by and moves with the first beam.

7. The micro-electromechanical accelerometer of claim 5, wherein the first sensor is supported by and moves with the second beam.

8. The micro-electromechanical accelerometer of claim 4, wherein the electrical coupling between the first and second beams comprises a capacitance between a first plurality of electrodes of the first beam and a second plurality of electrodes of the second beam.

9. The micro-electromechanical accelerometer of claim 8, wherein the acceleration along the axis perpendicular to the plane of the substrate is measured by a change in the capacitance between the first plurality of electrodes and the second plurality of electrodes.

10. The micro-electromechanical accelerometer of claim 9, wherein the first plurality of electrodes of the first beam and the second plurality of electrodes of the second beam form an area of overlap that linearly changes with the acceleration along the axis perpendicular to the plane of the substrate.

11. The micro-electromechanical accelerometer of claim 10, wherein a radius of curvature of the first beam is different than a radius of curvature of the second beam, thereby resulting in the area of overlap.

12. The micro-electromechanical accelerometer of claim 10, wherein the first beam comprises an interconnected planar set of beams having a silicon core with a first oxide layer disposed on a top of the first beam, and wherein the second beam comprises an interconnected planar set of beams having a silicon core with a second oxide layer disposed on a top of the second beam.

13. The micro-electromechanical accelerometer of claim 12, wherein a thickness of the first oxide layer is different than a thickness of the second oxide layer, thereby resulting in the area of overlap.

14. The micro-electromechanical accelerometer of claim 1, wherein the second sensor further comprises a nub that confines a range of motion of the first beam.

15. The micro-electromechanical accelerometer of claim 1, wherein the single support structure comprises traces that electrically couple the second sensor to traces on the substrate.

16. The micro-electromechanical accelerometer of claim 1, wherein the single support structure also supports the first sensor relative to the substrate.

17. The micro-electromechanical accelerometer of claim 16, wherein the single support structure comprises traces that electrically couple the first sensor and the second sensor to traces on the substrate.

18. The micro-electromechanical accelerometer of claim 1, further comprising:
    a third sensor configured to measure an acceleration along a second axis parallel to a plane of the substrate, wherein the second axis is perpendicular to the first axis; and
    a fourth sensor configured to measure an acceleration along the axis perpendicular to the plane of the substrate, wherein the fourth sensor comprises a third beam, a fourth beam and a second single support structure, wherein the second single support structure supports the third and fourth beams relative to the substrate, and wherein the third and fourth beams circumscribe the third sensor.

19. The micro-electromechanical accelerometer of claim 18, wherein the acceleration along the second axis is measured based on a differential capacitance among electrodes of the third sensor.

20. The micro-electromechanical accelerometer of claim 18, wherein the second sensor and fourth sensor are collectively configured to measure the acceleration along the axis perpendicular to the plane of the substrate based on a differential electrical coupling between (i) the first and second beams and (ii) the third and fourth beams.

21. The micro-electromechanical accelerometer of claim 20, wherein the second beam circumscribes the first beam and the second beam is rigidly coupled to the single support structure, thereby restricting movement of the second beam.

22. The micro-electromechanical accelerometer of claim 21, wherein the fourth beam circumscribes the third beam and the third beam is rigidly coupled to the second single support structure, thereby restricting movement of the third beam.

23. A micro-electromechanical accelerometer, comprising:
    a substrate;
    a first sensor comprising a mass and a frame, wherein the mass comprises a first plurality of electrodes and the frame comprises a second plurality of electrodes interdigitated with and electrically coupled to the first plurality of electrodes, wherein the mass moves relative to the frame in response to an acceleration along a first axis parallel to a plane of the substrate causing a measurable change in the electrical coupling between the first and second plurality of electrodes; and a second sensor comprising a first beam, a second beam and a single support structure, wherein the single support structure supports the first and second beams relative to the substrate, wherein the first beam comprises a third plurality of electrodes and the second beam comprises a fourth plurality of electrodes interdigitated with and electrically coupled to the third plurality of electrodes, wherein the first beam moves relative to the second beam in response to an acceleration along an axis perpendicular to the plane of the substrate causing a measurable change in the electrical coupling between the third and fourth plurality of electrodes, and wherein the first and second beams circumscribe the first sensor.

24. The micro-electromechanical accelerometer of claim 23, wherein a radius of curvature of the first beam is different than a radius of curvature of the second beam, thereby causing the third plurality of electrodes to be offset from the fourth plurality of electrodes.

25. The micro-electromechanical accelerometer of claim 23, wherein the first beam comprises a first oxide layer and the second beam comprises a second oxide layer, a thickness of the first oxide layer being different than a thickness of the second oxide layer, thereby causing the third plurality of electrodes to be offset from the fourth plurality of electrodes.

26. The micro-electromechanical accelerometer of claim 23, wherein the second sensor further comprises a nub that confines a range of motion of the first beam.

27. The micro-electromechanical accelerometer of claim 23, wherein the single support structure comprises traces that electrically couple the second sensor to traces on the substrate.

28. The micro-electromechanical accelerometer of claim 23, wherein the single support structure also supports the first sensor relative to the substrate.

29. The micro-electromechanical accelerometer of claim 28, wherein the single support structure comprises traces that electrically couple the first sensor and the second sensor to traces on the substrate.

30. The micro-electromechanical accelerometer of claim 28, wherein the second sensor further comprises a connector coupled to both the second beam and the single support structure, and wherein the connector restricts movement of the second beam.

31. The micro-electromechanical accelerometer of claim 23, further comprising:

a third sensor comprising a second mass and a second frame, wherein the second mass comprises a fifth plurality of electrodes and the second frame comprises a sixth plurality of electrodes interdigitated with and electrically coupled to the fifth plurality of electrodes, wherein the second mass moves relative to the second frame in response to an acceleration along a second axis parallel to a plane of the substrate causing a measurable change in the electrical coupling between the fifth and sixth plurality of electrodes, wherein the second axis is perpendicular to the first axis; and a fourth sensor comprising a third beam, a fourth beam and a second single support structure, wherein the second single support structure supports the third and fourth beams relative to the substrate, wherein the third beam comprises a seventh plurality of electrodes and the fourth beam comprises an eighth plurality of electrodes interdigitated with and electrically coupled to the seventh plurality of electrodes, wherein the third beam moves relative to the fourth beam in response to an acceleration along the axis perpendicular to the plane of the substrate causing a measurable change in the electrical coupling between the seventh and eighth plurality of electrodes, and wherein the third and fourth beams circumscribe the third sensor.

32. The micro-electromechanical accelerometer of claim 31, wherein the second sensor and the fourth sensor are configured to measure a difference between (i) the measurable change in the electrical coupling between the third and fourth plurality of electrodes and (ii) the measurable change in the electrical coupling between the seventh and eighth plurality of electrodes.

33. The micro-electromechanical accelerometer of claim 31, wherein the electrical coupling between the third and fourth plurality of electrodes comprises a first capacitance and the electrical coupling between the seventh and eighth plurality of electrodes comprises a second capacitance, and wherein the second sensor and the fourth sensor are configured to measure a difference between the first capacitance and the second capacitance.

34. A method for configuring a micro-electromechanical accelerometer, comprising:

supporting a first sensor relative to a substrate by a single support structure, wherein the first sensor is configured to measure an acceleration along an axis perpendicular to a plane of the substrate, and wherein the first sensor comprises a first beam and a second beam; and circumscribing a second sensor with the first and second beams of the first sensor, wherein the second sensor is configured to measure an acceleration along a first axis parallel to the plane of the substrate.

35. The method of claim 34, further comprising:

offsetting the first beam relative to the second beam based on an amount of oxide included on each of the first and second beams.

36. The method of claim 34, further comprising:

electrically coupling the second sensor to traces on the substrate by traces included in the single support structure.

37. The method of claim 34, further comprising:

supporting the second sensor relative to the substrate by the single support structure.

38. The method of claim 37, further comprising:

electrically coupling the first sensor and the second sensor to traces on the substrate by traces in the single support structure.

39. The method of claim 37, further comprising:

coupling a connector to both the second beam and the single support structure, thereby restricting movement of the second beam.

40. The method of claim 34, further comprising:

supporting a third sensor relative to the substrate by a second single support structure, wherein the third sensor is configured to measure an acceleration along the axis perpendicular to the plane of the substrate, and wherein the third sensor comprises a third beam and a fourth beam; and circumscribing a fourth sensor with the third and fourth beams of the third sensor, wherein the fourth sensor is configured to measure an acceleration along a second axis parallel to the plane of the substrate, wherein the second axis parallel to the plane of the substrate is perpendicular to the first axis parallel to the plane of the substrate.

41. The method of claim 40, further comprising:
measuring the acceleration along the axis perpendicular to the plane of the substrate based on a differential electrical coupling between (i) the first and second beams and (ii) the third and fourth beams.

* * * * *